(12) United States Patent
Smit et al.

(10) Patent No.: US 10,331,765 B2
(45) Date of Patent: Jun. 25, 2019

(54) METHODS AND APPARATUS FOR TRANSLATING FORMS TO NATIVE MOBILE APPLICATIONS

(71) Applicant: SourceCode Technology Holdings, Inc., Bellevue, WA (US)

(72) Inventors: Oliver Mitchel Smit, Centurion (ZA); Werner Lowe, Gauteng (ZA); Marius Burger, Centurion (ZA); Carel Aaron du Toit, Roodepoort (ZA)

(73) Assignee: SOURCECODE TECHNOLOGY HOLDINGS, INC., Redmond, WA (US)

( * ) Notice: Subject to any disclaimer, the term of this patent is extended or adjusted under 35 U.S.C. 154(b) by 415 days.

(21) Appl. No.: 13/902,247

(22) Filed: May 24, 2013

(65) Prior Publication Data

US 2014/0351684 A1    Nov. 27, 2014

(51) Int. Cl.
| | | |
|---|---|---|
| *G06F 17/00* | (2019.01) | |
| *G06F 17/21* | (2006.01) | |
| *G06Q 10/06* | (2012.01) | |
| *H04L 29/06* | (2006.01) | |
| *G06F 16/25* | (2019.01) | |

(52) U.S. Cl.
CPC .......... *G06F 17/212* (2013.01); *G06Q 10/06* (2013.01); *G06F 16/258* (2019.01); *H04L 67/42* (2013.01)

(58) Field of Classification Search
CPC .... G06F 17/211; G06F 17/212; G06F 17/243; G06F 17/30905; G06F 19/323; G06F 16/258; H04W 4/003; H04L 67/42
See application file for complete search history.

(56) References Cited

U.S. PATENT DOCUMENTS

| | | |
|---|---|---|
| 5,404,294 A | 4/1995 | Karnik |
| 5,450,537 A | 9/1995 | Hirai et al. |
| 5,535,321 A | 7/1996 | Massaro et al. |
| 5,572,643 A | 11/1996 | Judson |
| 5,600,789 A | 2/1997 | Parker |
| 5,640,577 A | 6/1997 | Scharmer |
| 5,701,451 A | 12/1997 | Rogers et al. |
| 5,706,434 A | 1/1998 | Kremen et al. |
| 5,710,883 A | 1/1998 | Hong et al. |
| 5,710,918 A | 1/1998 | Lagarde et al. |
| 5,734,837 A | 3/1998 | Flores et al. |
| 5,737,592 A | 4/1998 | Nguyen et al. |
| 5,774,887 A | 6/1998 | Wolff et al. |
| 5,781,720 A | 7/1998 | Parker |
| 5,883,639 A | 3/1999 | Walton et al. |

(Continued)

FOREIGN PATENT DOCUMENTS

| | | |
|---|---|---|
| EP | 1 688 836 | 8/2006 |
| EP | 1 862 900 | 12/2007 |
| WO | 2012/139903 | 10/2012 |

OTHER PUBLICATIONS

European Search Report dated Aug. 27, 2014 in corresponding Application No. 14169068.5-1955.

(Continued)

*Primary Examiner* — Andrew T McIntosh
(74) *Attorney, Agent, or Firm* — K&L Gates LLP

(57) ABSTRACT

A mobile application engine includes an adapter, translation server and mobile renderer for providing forms as native mobile applications on a mobile device.

19 Claims, 34 Drawing Sheets

(56) References Cited

U.S. PATENT DOCUMENTS

| | | | |
|---|---|---|---|
| 5,999,911 A | 12/1999 | Berg | |
| 6,084,585 A | 7/2000 | Kraft et al. | |
| 6,192,380 B1 | 2/2001 | Light et al. | |
| 6,199,079 B1 | 3/2001 | Gupta et al. | |
| 6,324,685 B1* | 11/2001 | Balassanian | G06F 9/445 |
| | | | 717/118 |
| 6,345,278 B1 | 2/2002 | Hitchcock | |
| 6,460,042 B1 | 10/2002 | Hitchcock | |
| 6,470,227 B1 | 10/2002 | Rangachari | |
| 6,507,865 B1 | 1/2003 | Hanson et al. | |
| 6,574,631 B1 | 6/2003 | Subramanian | |
| 6,591,272 B1 | 7/2003 | Williams | |
| 6,633,915 B1 | 10/2003 | Hashimoto | |
| 6,694,362 B1 | 2/2004 | Secor et al. | |
| 6,694,508 B1* | 2/2004 | Moore | G06F 8/71 |
| | | | 707/999.001 |
| 6,772,407 B1 | 8/2004 | Leymann et al. | |
| 6,789,252 B1 | 9/2004 | Burke et al. | |
| 6,845,378 B1 | 1/2005 | Pauly et al. | |
| 6,871,327 B2 | 3/2005 | Polk | |
| 6,950,831 B2 | 9/2005 | Haley | |
| 6,957,186 B1 | 10/2005 | Guheen et al. | |
| 6,966,053 B2 | 11/2005 | Paris | |
| 6,970,844 B1 | 11/2005 | Bierenbaum | |
| 6,973,626 B1 | 12/2005 | Lahti | |
| 6,978,379 B1 | 12/2005 | Goh et al. | |
| 6,981,028 B1 | 12/2005 | Rawat | |
| 6,983,421 B1 | 1/2006 | Lahti | |
| 6,996,800 B2 | 2/2006 | Lucassen | |
| 7,003,729 B1 | 2/2006 | Rajala | |
| 7,024,415 B1 | 4/2006 | Kreiner | |
| 7,076,411 B2 | 7/2006 | Santori | |
| 7,080,066 B1 | 7/2006 | Scheurich et al. | |
| 7,111,300 B1 | 9/2006 | Salas et al. | |
| 7,155,496 B2 | 12/2006 | Froyd | |
| 7,155,720 B2 | 12/2006 | Casati et al. | |
| 7,159,185 B1 | 1/2007 | Vedula et al. | |
| 7,174,342 B1 | 2/2007 | Scheurich et al. | |
| 7,184,967 B1 | 2/2007 | Mital et al. | |
| 7,191,391 B2 | 3/2007 | Takashima | |
| 7,200,811 B1 | 4/2007 | Takashima | |
| 7,203,699 B2 | 4/2007 | Bellamy | |
| 7,206,998 B2 | 4/2007 | Pennell | |
| 7,234,105 B2 | 6/2007 | Bezrukov | |
| 7,240,323 B1 | 7/2007 | Desai | |
| 7,272,820 B2 | 9/2007 | Klianev | |
| 7,313,757 B2 | 12/2007 | Bradley et al. | |
| 7,353,248 B1 | 4/2008 | Kirkpatrick | |
| 7,376,891 B2 | 5/2008 | Hitchcock | |
| 7,430,524 B2 | 9/2008 | Shah | |
| 7,500,597 B2 | 3/2009 | Mann | |
| 7,725,356 B2 | 5/2010 | Shah | |
| 7,734,999 B2 | 6/2010 | Leung | |
| 7,752,607 B2 | 7/2010 | Larab | |
| 7,827,492 B2 | 11/2010 | Estrada | |
| 8,365,203 B2 | 1/2013 | Wong et al. | |
| 2001/0044738 A1 | 11/2001 | Elkin et al. | |
| 2001/0047279 A1 | 11/2001 | Gargone | |
| 2002/0029218 A1 | 3/2002 | Bentley et al. | |
| 2002/0052769 A1 | 5/2002 | Navani et al. | |
| 2002/0059264 A1 | 5/2002 | Fleming et al. | |
| 2002/0069192 A1* | 6/2002 | Aegerter | G06Q 10/10 |
| 2002/0091736 A1 | 7/2002 | Wall | |
| 2002/0095423 A1 | 7/2002 | Dessloch | |
| 2002/0120628 A1 | 8/2002 | Hitchcock | |
| 2002/0188583 A1 | 12/2002 | Rukavina | |
| 2002/0194219 A1* | 12/2002 | Bradley | G06F 17/243 |
| | | | 715/223 |
| 2003/0023953 A1 | 1/2003 | Lucassen | |
| 2003/0058277 A1 | 3/2003 | Bowman Amuah | |
| 2003/0101022 A1 | 5/2003 | Shah | |
| 2003/0101023 A1 | 5/2003 | Shah | |
| 2003/0106039 A1 | 6/2003 | Rosnow et al. | |
| 2003/0115545 A1 | 6/2003 | Hull | |
| 2003/0145018 A1 | 7/2003 | Hitchcock | |
| 2003/0149714 A1 | 8/2003 | Casati et al. | |
| 2003/0197733 A1 | 10/2003 | Beauchamp et al. | |
| 2003/0200527 A1 | 10/2003 | Lynn et al. | |
| 2003/0200533 A1 | 10/2003 | Roberts et al. | |
| 2004/0002881 A1 | 1/2004 | Hu et al. | |
| 2004/0078373 A1 | 4/2004 | Ghoneimy et al. | |
| 2004/0122699 A1 | 6/2004 | Brito et al. | |
| 2004/0199540 A1 | 10/2004 | Nojima | |
| 2004/0199863 A1 | 10/2004 | Hitchcock | |
| 2004/0237030 A1 | 11/2004 | Malkin | |
| 2004/0237040 A1 | 11/2004 | Malkin | |
| 2004/0260593 A1 | 12/2004 | Abraham-Fuchs et al. | |
| 2004/0267595 A1 | 12/2004 | Woodings | |
| 2004/0267897 A1 | 12/2004 | Hill et al. | |
| 2005/0055634 A1 | 3/2005 | Burns | |
| 2005/0080756 A1 | 4/2005 | Hitchcock | |
| 2005/0086092 A1 | 4/2005 | Kowalski et al. | |
| 2005/0086588 A1 | 4/2005 | McGregor et al. | |
| 2005/0125716 A1 | 6/2005 | Cragun | |
| 2005/0172212 A1 | 8/2005 | Birsa et al. | |
| 2005/0216282 A1 | 9/2005 | Chen et al. | |
| 2005/0223392 A1 | 10/2005 | Cox et al. | |
| 2005/0257267 A1 | 11/2005 | Williams et al. | |
| 2005/0273759 A1 | 12/2005 | Lucassen | |
| 2005/0283354 A1 | 12/2005 | Ouimet | |
| 2006/0005140 A1 | 1/2006 | Crew | |
| 2006/0031757 A9 | 2/2006 | Vincent | |
| 2006/0036941 A1 | 2/2006 | Neil | |
| 2006/0047672 A1 | 3/2006 | Habon et al. | |
| 2006/0064674 A1 | 3/2006 | Olson | |
| 2006/0075382 A1 | 4/2006 | Shaburov | |
| 2006/0080616 A1 | 4/2006 | Vogel | |
| 2006/0119619 A1 | 6/2006 | Fagans et al. | |
| 2006/0122975 A1 | 6/2006 | Taylor et al. | |
| 2006/0129906 A1 | 6/2006 | Wall | |
| 2006/0150107 A1 | 7/2006 | Leung | |
| 2006/0178890 A1 | 8/2006 | Marechal | |
| 2006/0184410 A1 | 8/2006 | Ramamurthy et al. | |
| 2006/0190310 A1 | 8/2006 | Gudla et al. | |
| 2006/0195816 A1 | 8/2006 | Grandcolas | |
| 2006/0225032 A1 | 10/2006 | Klerk et al. | |
| 2007/0027733 A1 | 2/2007 | Bolle | |
| 2007/0073776 A1 | 3/2007 | Kalalian et al. | |
| 2007/0107043 A1 | 5/2007 | Newstadt et al. | |
| 2007/0014339 A1 | 6/2007 | Van Wyk et al. | |
| 2007/0132779 A1 | 6/2007 | Gilbert et al. | |
| 2007/0139441 A1 | 6/2007 | Lucas et al. | |
| 2007/0143305 A1 | 6/2007 | Van Wyk et al. | |
| 2007/0165031 A1 | 7/2007 | Gilbert et al. | |
| 2007/0168060 A1 | 7/2007 | Nixon et al. | |
| 2007/0179641 A1 | 8/2007 | Lucas et al. | |
| 2007/0300236 A1 | 12/2007 | Hing | |
| 2009/0254912 A1 | 10/2009 | Roundtree et al. | |
| 2010/0281475 A1* | 11/2010 | Jain | G06F 8/658 |
| | | | 717/172 |
| 2011/0078678 A1 | 3/2011 | Matthews | |
| 2011/0154305 A1* | 6/2011 | LeRoux | G06F 8/71 |
| | | | 717/140 |
| 2011/0250872 A1* | 10/2011 | Kim | G06F 17/30861 |
| | | | 455/414.1 |
| 2011/0252147 A1* | 10/2011 | Ewe | G06F 17/30893 |
| | | | 709/227 |
| 2012/0159310 A1 | 6/2012 | Chang et al. | |
| 2012/0290914 A1 | 11/2012 | Lee et al. | |
| 2013/0275848 A1* | 10/2013 | Neagu | G06F 8/70 |
| | | | 715/223 |

OTHER PUBLICATIONS

Written Opinion of the International Searching Authority for International Application No. PCT/US06/60470 dated Mar. 3, 2008.
Written Opinion of the International Searching Authority for International Application No. PCT/US08/58019 dated Jul. 2, 2008.
Written Opinion of the International Searching Authority for International Application No. PCT/US08/58020 dated Jun. 27, 2008.
Written Opinion of the International Searching Authority for International Application No. PCT/US08/54414 dated Jul. 25, 2008.

(56) References Cited

OTHER PUBLICATIONS

Written Opinion of the International Searching Authority for International Application No. PCT/US08/63087 dated Jul. 25, 2008.
Written Opinion of the International Searching Authority for International Application No. PCT/US08/64689 dated Aug. 7, 2008.
Cheng, An object-oriented organizational model to support dynamic role-based access control in electronic commerce, Elsevier Science B.V. , 2000, pp. 1-13.
Smith et al., "Business Process Management: The Third Wave," ISBN 0929652339 Technical Excerpt Theory.
Lavana, et al. "Executable Workflows: A Paradigm for Collaborative Design on the Internet", 1997, ACM, p. 1-6.
Office Action dated Jun. 23, 2010 from U.S. Appl. No. 11/556,047.
Office Action dated Oct. 14, 2009 from U.S. Appl. No. 11/556,044.
Office Action dated Aug. 18, 2008 from U.S. Appl. No. 11/556,029.
Office Action dated Mar. 16, 2009 from U.S. Appl. No. 11/556,029.
Office Action dated Sep. 3, 2009 from U.S. Appl. No. 11/556,029.
Office Action dated May 11, 2010 from U.S. Appl. No. 11/556,029.
Office Action dated Oct. 19, 2010 from U.S. Appl. No. 11/556,029.
Office Action dated May 21, 2010 from U.S. Appl. No. 11/556,023.
Office Action dated Aug. 31, 2010 from U.S. Appl. No. 11/556,040.
Office Action dated Feb. 1, 2010 from U.S. Appl. No. 11/555,996.
Office Action dated Jul. 19, 2010 from U.S. Appl. No. 11/555,996.
Office Action dated Sep. 30, 2010 from U.S. Appl. No. 11/556,016.
Office Action dated Aug. 2, 2010 from U.S. Appl. No. 11/556,001.
Office Action dated Feb. 16, 2010 from U.S. Appl. No. 11/556,001.
Office Action dated Nov. 10, 2010 from U.S. Appl. No. 11/556,023.
Office Action dated Aug. 2, 2012 from U.S. Appl. No. 11/555,996.
Office Action dated Jan. 23, 2013 from U.S. Appl. No. 12/117,455.
Office Action dated May 2, 2012 from U.S. Appl. No. 11/556,029.
Office Action dated Jun. 20, 2012 from U.S. Appl. No. 12/117,455.
Office Action dated Mar. 25, 2011 from U.S. Appl. No. 11/556,023.
Office Action dated Jan. 28, 2011 from U.S. Appl. No. 11/556,047.
Office Action dated Jan. 24, 2011 from U.S. Appl. No. 11/556,001.
Office Action dated Feb. 2, 2011from U.S. Appl. No. 11/556,040.
Office Action dated Mar. 23, 2011 from U.S. Appl. No. 11/556,029.
Notice of Allowance dated Apr. 4, 2011 from U.S. Appl. No. 11/556,044.
Notice of Allowance dated Mar. 23, 2011 from U.S. Appl. No. 11/556,016.
Notice of Allowance dated Feb. 25, 2011 from U.S. Appl. No. 11/556,044.
Notice of Allowance and Issue Fee Due dated Mar. 23, 2012 for U.S. Appl. No. 11/556,040.
Notice of Allowance and Issue Fee Due dated Apr. 11, 2012 for U.S. Appl. No. 11/556,047.
Advisory Action dated Apr. 14, 2011 from U.S. Appl. No. 11/556,040.
EP Search Report dated Mar. 18, 2011.
"The Enterprise Objects Framework", Enterprise Objects Framework: Building Reusable Business Objects; XX, XX Jul. 1, 1994 (Jul. 1, 1994); pp. 1-13; XP0020478548.
The Object People "A White Paper: TOPLink for Java", Internet Citation 1997, XP002098153, Retrieved from the Internet: URL:http://objectpeople.on.ca/Toplink/Java/ToplinkJavaWhitepaper.pdf [retrieved on Jan. 1, 1997].
"Sun simplifies database programming with Java Blend" Internet Citation, Aug. 21, 1997 (Aug. 21, 1997), XP002098152, Retrieved from Internet: URL:http://java.sun.com.8081/pr/1997/august/pr970821-01.html [retrieved on Feb. 16, 1999].
PhoneGap Website, phonegap.com, printed to PDF on May 24, 2013.
Apache Cordova Website, cordova.apache.org, printed to PDF on May 24, 2013.
Australian Office Action dated Dec. 17, 2014, for corresponding Application No. 2014202725 (5 pages).
Australian Examination Report—Appl. No. 2016202239 dated Mar. 8, 2017—4 pages.
EP Office Action—Appl. No. 14 169 068.5-1871 dated Apr. 5, 2017—5 pages.

* cited by examiner

1700

| Expense Review | □ X |
|---|---|
| Employee Details | |

1712 —

First Name: Edward
Last Name: Lewis
Email: lewis@k2.com
Mobile: +65 123329291
Birthday: 1710  12/12/2012

1714 — Claims

1708 — + Add   X Delete

| Name | Description |
|---|---|
| Expense Review | Lance Morison - R500.00 - 5/12/2013 |

1716 — Expense History

Search: [🔍]

| Date ↑ | ID | Title | Description |
|---|---|---|---|
| 1/12/2013 | 14 | Title 1 | Description 1 |
| 1/12/2013 | 2 | Title 2 | Description 2 |
| 1/12/2013 | 23 | Title 3 | Description 3 |
| 1/12/2013 | 15 | Title 4 | Description 4 |
| 2/12/2013 | 4 | Title 5 | Description 5 |
| 2/12/2013 | 52 | Title 6 | Description 6 |
| 2/12/2013 | 75 | Title 7 | Description 7 |
| 3/12/2013 | 64 | Title 8 | Description 8 |
| 4/12/2013 | 1 | Title 9 | Description 9 |
| 4/12/2013 | 33 | Title 10 | Description 10 |

1718 — Comments 1702   1704   1706
Send Mail   Notify   Submit

OK   Cancel

METHODS AND APPARATUS FOR TRANSLATING FORMS TO NATIVE MOBILE APPLICATIONS

CROSS REFERENCE TO COMMONLY OWNED RELATED PATENTS AND APPLICATIONS

This application is related to U.S. Pat. No. 8,239,226, filed Nov. 2, 2006, entitled "METHODS AND APPARATUS FOR COMBINING PROPERTIES AND METHODS FROM A PLURALITY OF DIFFERENT DATA SOURCES"; U.S. Pat. No. 7,996,758, filed Nov. 2, 2006, entitled "METHODS AND APPARATUS FOR STORING DATA ASSOCIATED WITH AN ELECTRONIC FORM"; U.S. Patent Publication No. 2007/0143305, filed Nov. 2, 2006, entitled "METHODS AND APPARATUS FOR STORING FUNCTIONS ASSOCIATED WITH AN ELECTRONIC FORM"; U.S. Patent Publication No. 2007/0136367 now abandoned), filed Nov. 2, 2006, entitled "METHODS AND APPARATUS FOR DYNAMICALLY MODIFYING A BUSINESS OBJECT DEFINITION"; U.S. Pat. No. 8,224,853, filed Nov. 2, 2006, entitled "METHOD AND APPARATUS FOR UPDATING A PLURALITY OF DATA FIELDS IN AN ELECTRONIC FORM"; U.S. Patent Publication No. 2007/0208777 (now abandoned), filed Nov. 2, 2006, entitled "METHODS AND APPARATUS FOR DESIGNING A WORKFLOW PROCESS USING RESOURCE MAPS AND PROCESS MAPS"; U.S. Pat. No. 8,010,940, filed Nov. 2, 2006, entitled "METHODS AND APPARATUS FOR DESIGNING A WORKFLOW PROCESS USING INHERITANCE"; U.S. Patent Publication No. 2007/0130138 (now abandoned), filed Nov. 2, 2006, entitled "METHODS AND APPARATUS FOR STORING A COLLABORATIVELY DESIGNED WORKFLOW PROCESS"; and U.S. Patent Publication No. 2007/0143711, filed Nov. 2, 2006, entitled "METHODS AND APPARATUS FOR DISPLAYING A SETUP SEQUENCE", the entire contents of each of which are incorporated herein by reference and relied upon.

TECHNICAL FIELD

The present disclosure relates in general to translating forms to native mobile applications.

BACKGROUND

As the number of information sources in organizations is growing, it is becoming increasingly difficult for consumers of the information to access it in a logical and structured way that relates to the traditional business objects they find familiar within their organizations (e.g., customers, assets, vendors, staff, etc.). Data from existing systems is typically made available in a very technical way that requires significant technical and development skills to surface it to non technical users in the organization. No workable mechanism exists for non technical users to add information within a logical business object definition without involving technical or development skills. Similar, no workable solution exists today that allows both technical and non technical users of data to access their information from multiple data/information sources in a structured business object like way, while still maintaining the flexibility to add additional information definitions to the existing business objects or to create new business objects from existing or new data sources without the need for complex solution development.

Existing Enterprise Application Integration (EAI) systems combined with development tools can be used to custom develop solutions which make data and information more accessible, but these solutions are typically hard-coded and require significant technical and development skill to maintain and change over time. There is no workable way for non technical users to change the definition of the structured data (business objects) or to add additional information sources or fields within existing business object definitions that might already exist within their organizations. As an example, customer information might exist in a CRM system, ERP system and a custom issue tracking system. Existing EAI solutions assist in integrating data between these systems, but do not provide a mechanism to see a single definition of a customer as a logical business object regardless of where the information is being sourced from.

In addition, information workers are limited by the static business forms and information presented to them by the solution applications or custom developed applications they use on a day to day basis. Regardless of whether these forms are thin client (web or browser) based or thick/smart client (windows forms) based, the information worker's ability to add additional information on-demand to existing forms based on its current state and context, is extremely limited. Existing form technologies depend on a developer's involvement to bind the form to a data source (web service, database, etc.) which populates the form with information based on a user event (click of a button, etc.). Should the end user require additional information to be displayed on the form, he needs to rely on application specific pre-developed functionality that might allow him to see additional information or data fields on the forms. This implementation however depends on the logic encapsulated in the application or custom developed solution. The challenge remains to empower knowledge users to add additional information to a specific form, on demand, regardless of data source, without the need for technical or development involvement. Once these forms have been customized the underlying platform needs to store each user's settings in a personalization system which will allow it to recognize the user the next time he accesses the form. The result being that each user has the ability to see his personalized view of a form.

Still further, existing process automation tools do not provide the necessary level of modeling tools and concepts to allow both technical and non technical users to author a completed business process solution in a single modeling/automation tooling environment. It is extremely difficult for business analysts, business/process owner's technical people to use a single solution which allows for all roles to work seamlessly together to rapidly discover, model and automate business processes within organizations. Existing workflow and business process automation tools are disconnected and do not allow for a single environment which brings technical and non technical business users together with a set of tools that deeply integrate the necessary building blocks.

Additionally, the processes are not readily translated into mobile applications. In many cases, developing mobile applications for different mobile operating systems requires deep technical expertise.

SUMMARY

The disclosed system uses Enterprise Application Integration (EAI) sources (e.g., EAI software, Web Services, Application API) to provide a higher level framework (e.g., runtime broker and adapter services) with relating solution components (e.g., user interfaces and tooling) which empowers technical and non technical users to author logical business objects which includes data definitions (e.g., customer name, surname, etc.) and actions or methods (e.g., save, load, delete) from existing or new data sources. Existing data sources include ERP, CRM, and/or custom developed systems in an organization while new data sources are created and maintained by the disclosed system. The disclosed system allows users to combine data from multiple sources into one single business object definition, including data and method/actions definitions. The new logical business object exposes a single logical data structure and view of the object as well as a single set of logical methods that are associated with the object.

The object broker (runtime engine) interprets the new object definition and brokers data/information and method calls to the data sources (or existing systems). Additional fields can be added to the new object definition. These additional fields are associated with the unique identifiers from the other data sources included in the new object definition. The actual data is preferably stored in a new data store where all data structure and action (e.g., create, load, update, delete as examples) are managed by the runtime broker. The result being a dynamic business object whose definition can be changed by either adding or removing data or actions without the need to involve technical or development resources to reconfigure or recompile the actual objects.

Existing systems are accessed through a service object component. The service object for a specific back-end system implements the base interface expected by the object broker. This enables the object broker to use a consistent communication mechanism to exchange data and function calls with the applications it is integrating. The object Broker together with the service object interface provides the underlying infrastructure to exchange data, method calls and participation in supporting services such as transactions, compensations models, exception handling and role/security management. The object broker also includes a lightweight single-sign on implementation which allows it to use a single credential set to access multiple systems (each with their own authentication model).

Creating a new global form (changes reflected on all user's form instances) or personal form (changes and customizations saved on a per user basis) can be completed by the information worker in a rich web-based tooling environment, listing the potential data sources and user interface components. The underlying framework is also responsible for managing global and personal versions of forms seamlessly. In addition, the framework allows for the dynamic binding between business forms that has a logical relationship between each other. The forms are intelligent enough to recognize other forms that it might co-exist with on a single page, as well as how to react based on events that occur on these related forms. Logical relationships between forms can be the result of the relationship between the data being used on the page and/or it can be relationships defined by the user by means of simply linking events from one form to actions on another. For example, an order list form might have a relationship with a customer form which will allow it to automatically load a list of orders for a specific customer when the two forms are displayed on a single page. The order form is "aware" of its relationship with the customer form based on prior configuration information and can automatically display potential relationship configuration scenarios to the user when the form is placed on the same page as the customer form. In this case the relationship would stipulate that the order list form load itself whenever a customer number is entered into the customer number field on the customer form and the "find" button is clicked.

As a result, the information worker is empowered to change the layout of these pages on demand (e.g., add or remove forms on a page and define new relationships), which then in turn uses a personalization engine to store user specific changes and defined relationships between forms. The forms are not hard coded and can be changed on the fly. The disclosed system uses a model for dynamic form construction during runtime and design time, including data binding, event definitions and binding framework between events, controls and forms on a page.

The disclosed system also facilitates the creation of automated processes by both technical and non technical users. Process discovery features assist users during the process identification phase. The tools provided assist both technical and non technical users to identify processes within the organization, including supporting solution artifacts such as forms, rules, actions, outcomes and business objects involved. Process modeling features include the ability to combine the defined artifacts into a process model that can be published into a runtime environment where it can be executed and used by business users in the organization.

The disclosed system also generates native mobile applications that can be executed on mobile operating systems. The mobile applications contain the full feature set of a form that may be run, for example, on a desktop computer.

Additional features and advantages are described herein, and will be apparent from, the following Detailed Description and the figures.

BRIEF DESCRIPTION OF THE FIGURES

FIGS. 17 to 21 are example screenshots of a form rendered on a desktop computer, according to an example embodiment of the present invention.

DETAILED DESCRIPTION

Figure 1:
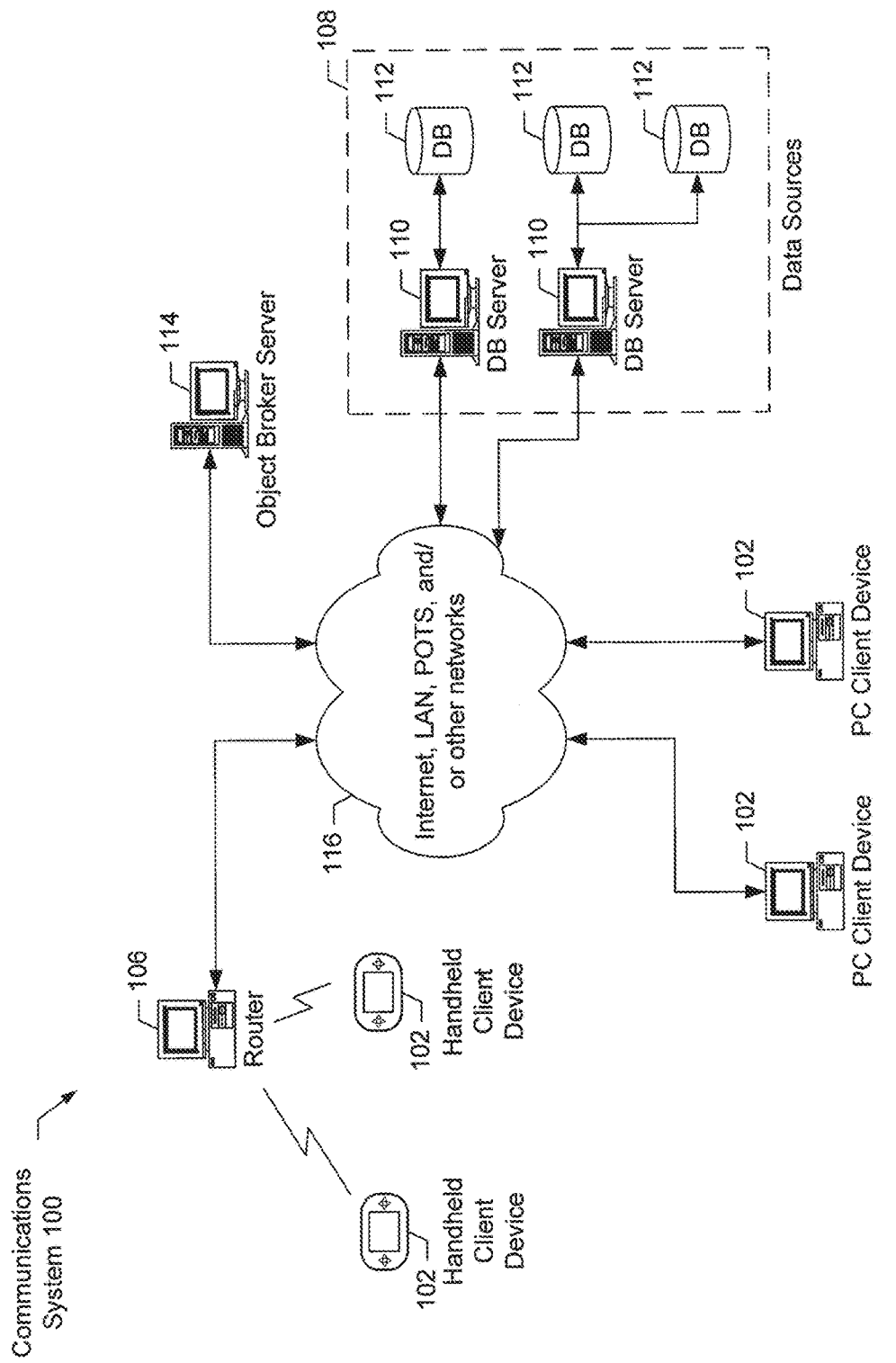
FIG. 1 is a high level block diagram of a communications system.

The present system is most readily realized in a network communications system. A high level block diagram of an exemplary network communications system 100 is illustrated in FIG. 1. The illustrated system 100 includes one or more client devices 102, one or more routers 106, and a plurality of different data sources 108 including database servers 110 and/or databases 112. Data transferred to/from the client devices 102 from/to the data sources 108 is managed by one or more object broker servers 114. Each of these devices may communicate with each other via a connection to one or more communications channels 116 such as the Internet and/or some other data network, including, but not limited to, any suitable wide area network or local area network. It will be appreciated that any of the devices described herein may be directly connected to each other instead of over a network.

The data sources 108 store a plurality of files, programs, and/or web pages in one or more databases 112 for use by the client devices 102. For example, a data source may store customer information. The data sources 108 may be connected directly to a database server 110 and/or via one or more network connections.

One data source 108 and/or one object broker server 114 may interact with a large number of other devices. Accordingly, each data source 108 and/or one object broker server 114 is typically a high end computer with a large storage capacity, one or more fast microprocessors, and one or more high speed network connections. Conversely, relative to a typical server, each client device 102 typically includes less storage capacity, a single microprocessor, and a single network connection.

Figure 2:
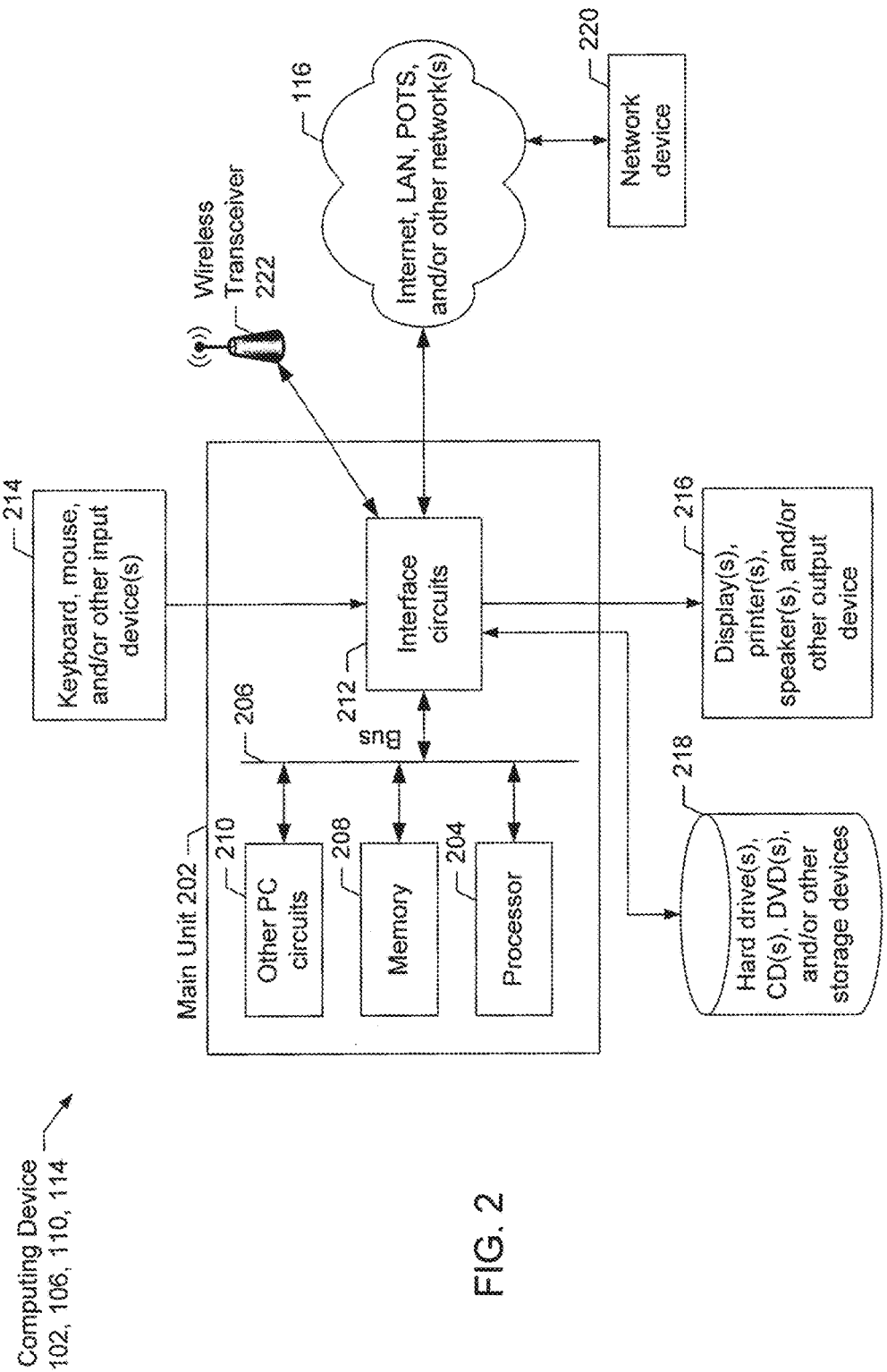
FIG. 2 is a more detailed block diagram showing one example of a computing device.

A more detailed block diagram of the electrical systems of a computing device (e.g., handheld client device 102, personal computer client device 102, router 106, database server 110, and/or object broker server 114) is illustrated in FIG. 2. Although the electrical systems of these computing devices may be similar, the structural differences between these devices are well known. For example, a typical handheld client device 102 is small and lightweight compared to a typical database server 110.

The example computing device 102, 106, 110, 114 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. The memory 208 may also store digital data indicative of documents, files, programs, web pages, etc. retrieved from another computing device and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of display. The display 216 generates visual displays of data generated during operation of the computing device 102, 106, 110, 114. For example, the display 216 may be used to display web pages received from the object broker server 114 including data from multiple data sources 108. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of suitable data.

The computing device 102, 104 may also exchange data with other network devices 220 via a connection to the network 116. The network connection may be any type of network connection, such as an Ethernet connection, digital subscriber line (DSL), telephone line, coaxial cable, etc. Users of the system 100 may be required to register with one or more of the computing devices 102, 106, 110, 114. In such an instance, each user may choose a user identifier (e.g., e-mail address) and a password which may be required for the activation of services. The user identifier and password may be passed across the network 116 using encryption built into the user's web browser. Alternatively, the user identifier and/or password may be assigned by the computing device 102, 106, 110, 114.

Figure 3:
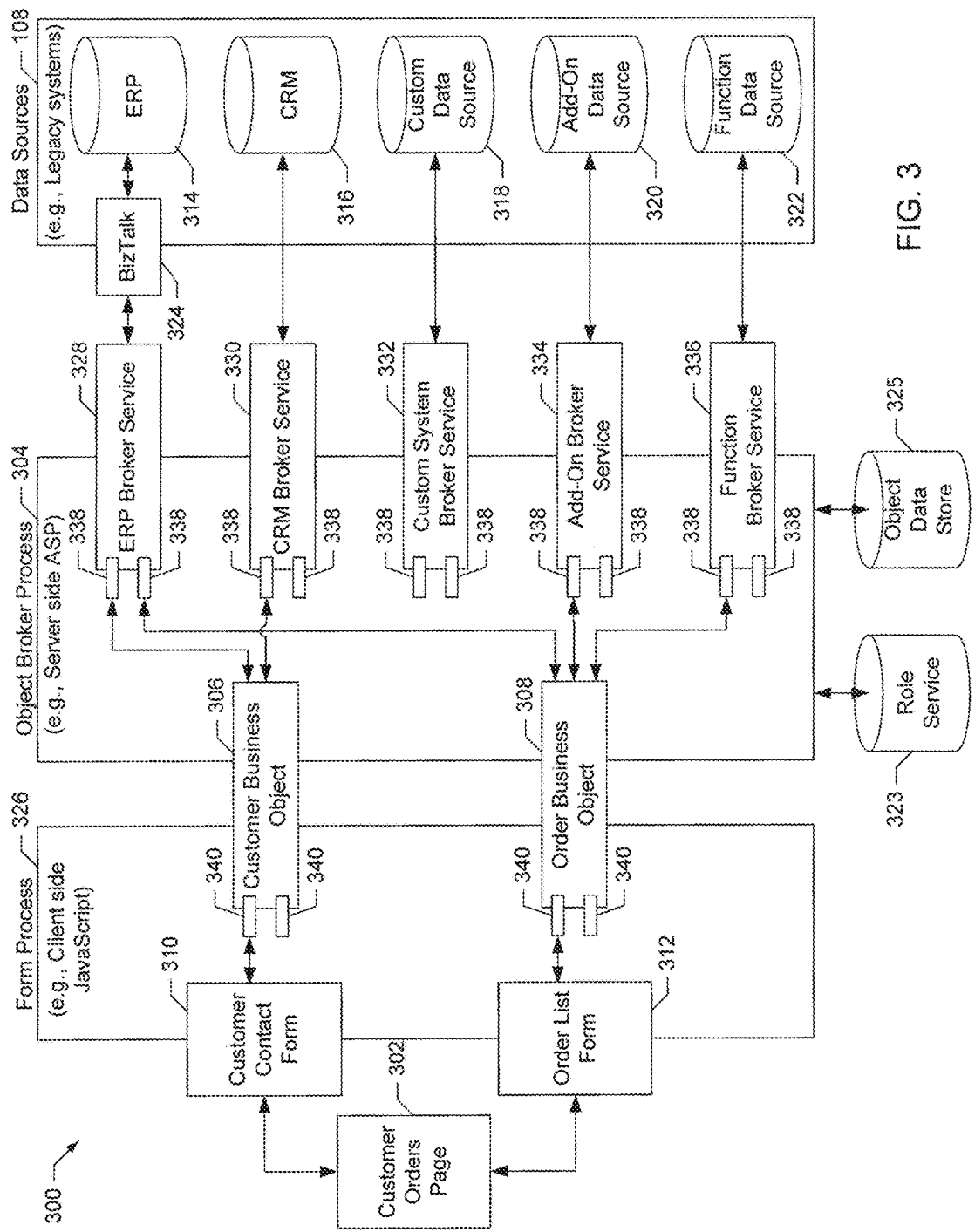
FIG. 3 is a block diagram showing example connections between a plurality of data sources and an electronic form via an object broker.

In one embodiment, a user at a client device 102 views and/or modifies data from a plurality of different data sources 108 via an interactive electronic form. An example block diagram showing connections between a plurality of data sources 108 and an electronic form 302 via an object broker process 304 is illustrated in FIG. 3. In general, the object broker process 304 (described in detail below with reference to FIG. 6) compiles data in a variety of different native formats from the different data sources 108 (e.g., different legacy database systems) into standardized business objects 306, 308 (e.g., in a declarative format such as XML). A user may then view the data using one or more electronic forms 302, 310, 312. In addition, the user may manipulate the data and/or add data via the electronic forms 302, 310, 312. In such instance, the object broker process 304 accepts the data via the business objects 306, 308 and stores the data back to the data sources 108 in the correct native format.

In this example, the data sources 108 include an enterprise resource planning (ERP) data source 314, a customer relationship management (CRM) data source 316, a custom data source 318, an add-on data source 320, and a function data source 322. In addition, a role service 323 and an object data store 325 are included in the system. Typically, an ERP data source 314 stores data related to accounts receivable, accounts payable, inventory, etc. Typically, a CRM data source 316 stores data related to leads, quotes, orders, etc. A custom data source 318 is a data source 108 that is not considered a standard commercial product. For example, a business may have a custom data source that stores real-time manufacturing information. Some data sources 108 may use and intermediary server for communications. For example, the ERP data source 314 uses a BizTalk server 324.

The add-on data source 320 stores data associated with form fields added by the user that are not supported by one of the other data sources 108. For example, a business may start up a frequent shopper card program and need to store a card number for each participant. Accordingly, a user may add a frequent buyer number field to an existing form containing legacy data. Because the existing data sources 108 in this example do not include a frequent buyer number field, the frequent buyer number field and associated data are stored by the add-on data source 320.

In order to manipulate data in a particular data source 108, the object broker process 304 preferably calls methods built into the associated data source 108. For example, each data source 108 typically includes methods to store/retrieve data to/from the data source 108 (e.g., the CRM data source may support a "LoadContact" method as described in detail below). In addition, the system 300 allows a user to author their own functions. For example, a user may need to apply a discount to certain customers. However, the existing data sources 108 may not include a method to calculate the discount. Accordingly, the user may author a "CalcDiscount" function as described below. User defined functions may use data from more than one data source 108. The definitions for these user defined functions is then stored in the function data source 322.

User defined functions may be created using a graphical user interface tool. For example, parameters for a user defined function may be defined by selecting a graphical representation of the parameter associated with a business object. Preferably, user defined functions are stored as snippets. Snippets include a structure portion that defines the function and a user interface portion that provides the user a way to test the function. For example, the structure portion may be stored as XML, and the user interface portion may be stored as HTML in the same file.

Some user defined functions may be executed by the client devices 102 thereby reducing communication with the server 110, 114. Other user defined functions may require server side execution. Preferably, a determination is made if a particular function is to be executes on the client side or the server side, and an indicator of this determination is stored with the function snippet. For example, user defined functions built from certain predefined primitives (e.g., add, multiply, loop, less than, etc.) may be determined to be executable by the client device 200, while other user defined functions that include database lookups (e.g., SQL statements) may be determined to be executable by a server 110, 114.

From a user's perspective, the data from the data sources 108 (as well as data calculated from data in the data sources 108 e.g., a discount) is viewed using one or more electronic forms 302, 310, 312. In addition, the user may manipulate the data and/or add data via the electronic forms 302, 310, 312. Forms 302, 310, 312 may be combined into pages 302 and one form may use data from more than one data source 108. For example, the customer orders page 302 combines the customer contact form 310 and the order list form 312 (as described in detail below with reference to FIG. 5). In addition, portions of forms and/or entire forms that are part of a larger page, may be locked so that only certain users can modify that portion of the form or page.

In order to facilitate forms 302, 310, 312 that combine data from different data sources 108, the system 300 employs an object broker process 304 (described in detail below with reference to FIG. 6) and a form process 326 (described in detail below with reference to FIG. 7). In one embodiment, the object broker process 304 is ASP code running on the object broker server 114 and the form process 326 is JavaScript running on a client device 102. The object broker process 304 compiles data in a variety of different native formats from the different data sources 108 into standardized business objects 306, 308 (e.g., XML files). In addition, the object broker process 304 accepts the data via the business objects 306, 308 and stores the data back to the data sources 108 in the correct native format.

More specifically, the object broker process 304 uses a plurality of broker services to communicate with the data sources 108. Preferably, one broker service is used for each data source 108. In this example, the object broker process 304 includes an ERP broker service 328, a CRM broker service 330, a custom broker service 332, an add-on broker service 334, and a function broker service 336. Each broker service 328, 330, 332, 334, 336 is designed to communicate with the associated data source 108 using the data source's native formats and protocols.

Each broker service 328, 330, 332, 334, 336 then automatically exposes the properties and methods of the associated data source 108 as standardized properties and methods 338 for use by the business objects 306, 308. For example, the ERP broker service 328 communicates with the ERP data source 314 via the BizTalk server 324 and exposes the ERP data source 314 properties and methods to the customer business object 306 and the order business object 308 as XML files. If new properties and/or methods become available from a data source 108, the associated broker service preferably detects these new properties and/or methods and automatically exposes the new properties and/or methods for use by the business objects 306, 308. The business objects 306, 308 may include some or all of the exposed properties and methods 338. Each business object 306, 308 then exposes its included properties and methods 340 to the form process 326.

The form process 326 calls business object methods 340 in response to form events and populates the forms 302, 310, 312 with data from the business object properties 340. For example, a user may press a "Load" button on the customer orders page 302, which causes the form process 326 to call one or more methods 340 exposed by the business objects 306, 308. This, in turn, causes the object broker process 304 to retrieve the appropriate data from one or more data sources 108. The data is then returned as properties of the business objects 306, 308, and the form process 326 uses the data to populate the forms 310, 312.

In addition, the form process 326 may store values to the business object properties 340, and call methods to have the new/modified data stored back to the appropriate data source 108 via the object broker process 304. For example, a from may accept a new value for a customer's address and call an UpdateContact method to have the new address stored to the appropriate data source 108.

Figure 4:
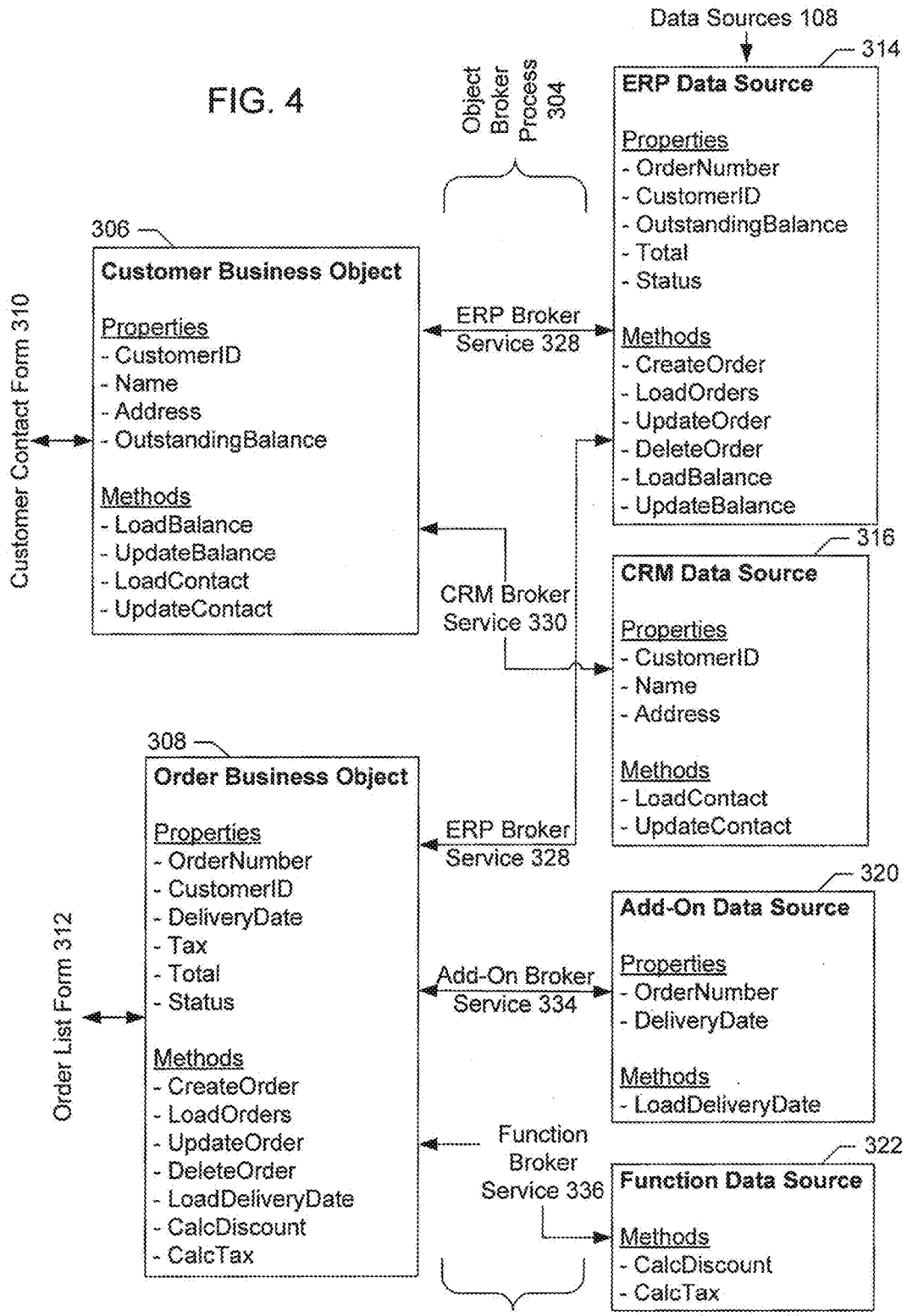
FIG. 4 is a block diagram showing example connections between data sources and business objects.

A more detailed block diagram showing these connections between the example data sources 108 and the example business objects 306, 308 is illustrated in FIG. 4. In this example, the customer business object 306 is connected to the ERP data source 314 and the CRM data source 316. The order business object 308 is connected to the ERP data source 314, the add-on data source 320, and the function data source 322. These logical connections may be defined in any suitable manner. For example, a graphical user interface may be used to allow a user to draw connection lines between graphical representations of the data sources 108 and graphical representations of the business objects 306, 308.

These logical connections are maintained by the object broker process 304. For example, data to populate the customer contact form 310 and the order list form 312 is brought into the customer business object 306 and the order business object 308 from the data sources 108 by the object broker process 304. Similarly, new and modified data from the customer contact form 310 and the order list form 312 is sent from the customer business object 306 and the order business object 308 to the data sources 108 by the object broker process 304. In addition, the role service 323 may generate a reduced object definition based on these full object definitions. For example, the role service 323 may retrieve a role associated with a particular user and a plurality of authorized properties and/or methods associated with that role. Unauthorized properties and/or methods are then removed from the business object definition (e.g., a user is not allowed to write to the customer business object, therefore the UpdateBalance and UpdateContact methods are removed).

The example customer business object 306 includes a customer ID property, a name property, an address property, an outstanding balance property, a load balance method, an update balance method, a load contact method, and an update contact method. The customer ID property in the customer business object 306 is connected to the customer ID property in the ERP data source 314 and/or the customer ID property in the CRM data source 316. The name property and the address property in the customer business object 306 are connected to the name property and the address property in the CRM data source 316. The outstanding balance property in the customer business object 306 is connected to the outstanding balance property in the ERP data source 314. The load balance method and the update balance method in the customer business object 306 are connected to the load balance method and the update balance method in the ERP data source 314. The load contact method and the update contact method in the customer business object 306 are connected to the load contact method and the update contact method in the CRM data source 316.

The example order business object 308 includes an order number property, a customer ID property, a delivery date property, a tax property, a total property, a status property, a create order method, a load orders method, an update order method, a delete order method, a calc discount method, and a calc tax method. The order number property and the status property in the order business object 308 are connected to the order number property and the status property in the ERP data source 314. The customer ID property in the order business object 308 is connected to the customer ID property in the ERP data source 314 and/or the customer ID property in the add-on data source 320. The delivery date property, tax property, and total property in the order business object 308 are connected to the delivery date property, tax property, and total property in the add-on data source 320. The create order method, load orders method, update orders method, and delete order method in the order business object 308 are connected to the create order method, load orders method, update orders method, and delete order method in the ERP data source 314. The calc discount method and the calc tax method in the order business object 308 are connected to the calc discount method and the calc tax method in the function data source 322. It will be appreciated that the names of the properties and/or methods in the data sources 108 need not be the same as the corresponding names of the properties and/or methods in the business objects 306, 308.

Figure 5:
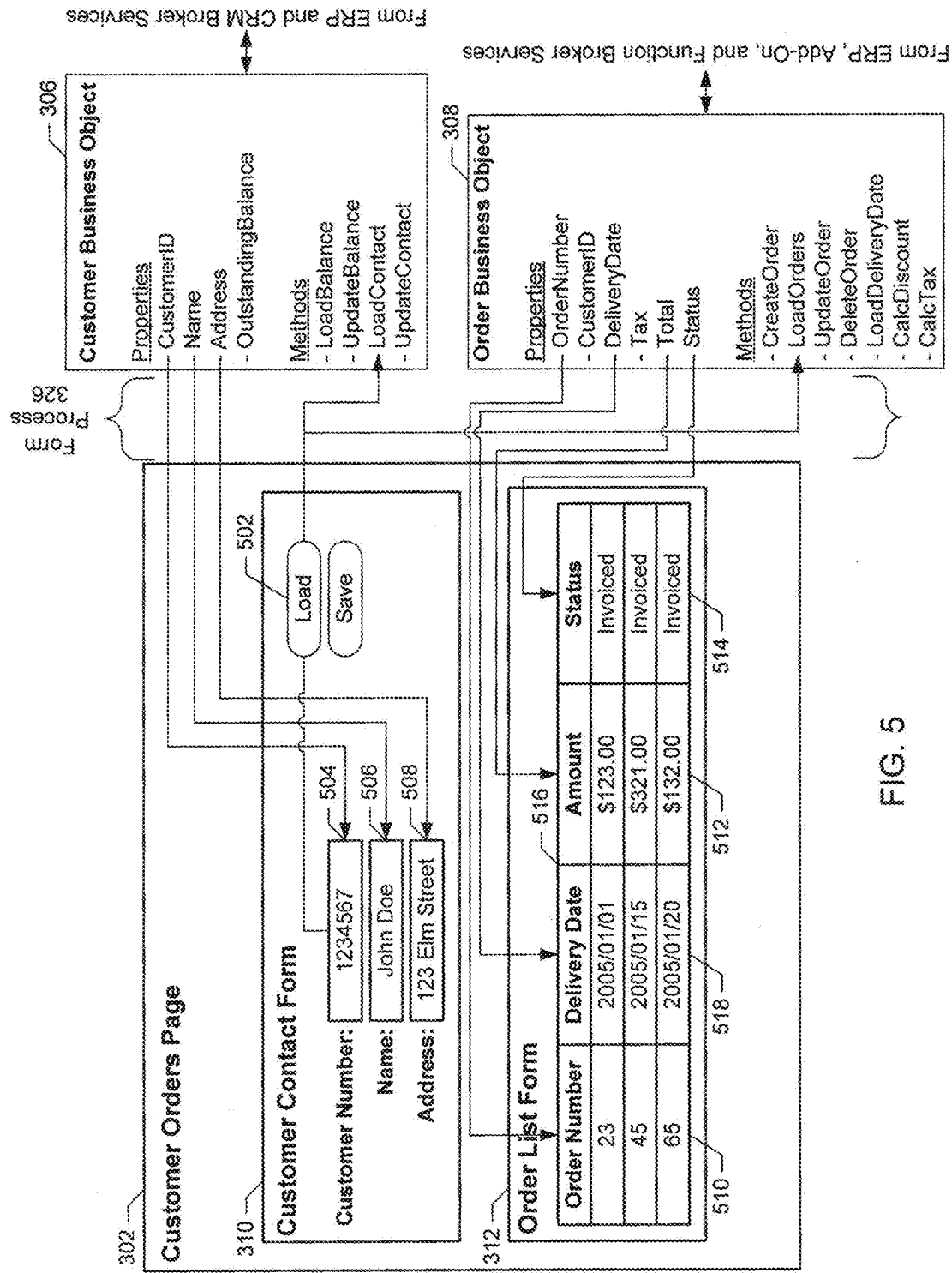
FIG. 5 is a more detailed view of an example customer orders page and the associated connections to a customer business object and an order business object.

A more detailed view of the customer orders page 302 and the associated connections to the customer business object 306 and the order business object 308 are illustrated in FIG. 5. In this example, if the user presses a load button 502, binder software associated with the form process 326 calls the load contact method of the customer business object 306 and the load orders method of the order business object 308. For both method calls, the form process 326 supplies the value of the customer number field 504 from the customer contact form 310. Alternatively, the form process 326 may obtain the value of the customer number field 504 from the customer ID property of the customer business object 306 and/or the order business object 308. These logical connections may be defined in any suitable manner. For example, a graphical user interface may be used to allow a user to draw connection lines between the forms 302, 310, 312 and graphical representations of the business objects 306, 308. Preferably, the user may design forms using only a web browser. For example, an asynchronous Java and XML (AJAX) interface may be used.

When the form process 326 calls the load contact method of the customer business object 306 with the value of the customer number field 504 as a parameter (e.g., using AJAX), the object broker process 304 translates the method call into the native language of the associated data source 108 and retrieves the associated data from the data source 108 in its native format. Specifically, the CRM broker service 330 invokes the native load contact method of the CRM data source 316 and receives the contact's name and address back from the CRM data source 316. The CRM broker service 330 then stores the name and contact data to the customer business object 306. For example, the CRM broker service 330 may be ASP code running on the object broker server 114 that sends an XML file (or another standardized file) to the form process 326, which is JavaScript code running on the client device 102 that is displaying the customer contact form 310. Once the customer business object 306 is updated with the new name and address data, the form process 326 populates the name field 506 and the address field 508 of the customer contact form 310. Using this method, an HTML form may be updated without posting the entire form to a server and re-rendering the entire HTML form.

Similarly, when the form process 326 calls the load orders method of the order business object 308 with the value of the customer number field 504 as a parameter, the object broker process 304 translates the method call into the native language of the associated data source 108 and retrieves the associated data from the data source 108 in its native format. Specifically, the ERP broker service 328 invokes the native load orders method of the ERP data source 314 and receives a list of order numbers, an associated list of totals, and an associated list of statuses back from the ERP data source 314. For example, the data may be returned as a database table. These values will eventually be used to fill out the order number column 510, the amount column 512, and the status column 514 of the order table 516 in the order list form 312. However, in this example, the delivery date column 518 cannot be supplied by the ERP data source 314, because the ERP data source 314 does not have this information.

The delivery date data is stored in the add-on data source 320 (i.e., the delivery date field was added later by the user). Accordingly, when the form process 326 calls the load orders method of the order business object 308 with the value of the customer number field 504 as a parameter, the add-on broker service 334 invokes the load delivery date method of the add-on data source 320 and receives a list of delivery dates and associated order numbers back from the add-on data source 320. The object broker process 304 and/or the form process 326 correlate the delivery dates with the amount data and status data received from the ERP data source 314 using the order number data that is common to both lists.

The object broker process 304 then stores the list of order numbers, the associated list of delivery dates, the associated list of totals, and the associated list of statuses to the order business object 308. For example, the ERP broker service 328, the add-on broker service 334, and/or other software (e.g., ASP code running on the object broker server 114) may send an XML file (or another standardized file) to the form process 326 (e.g., JavaScript running on the client device 102). Once the order business object 308 is updated with the new data, the form process 326 populates the order table 516 in the order list form 312.

Figure 6:
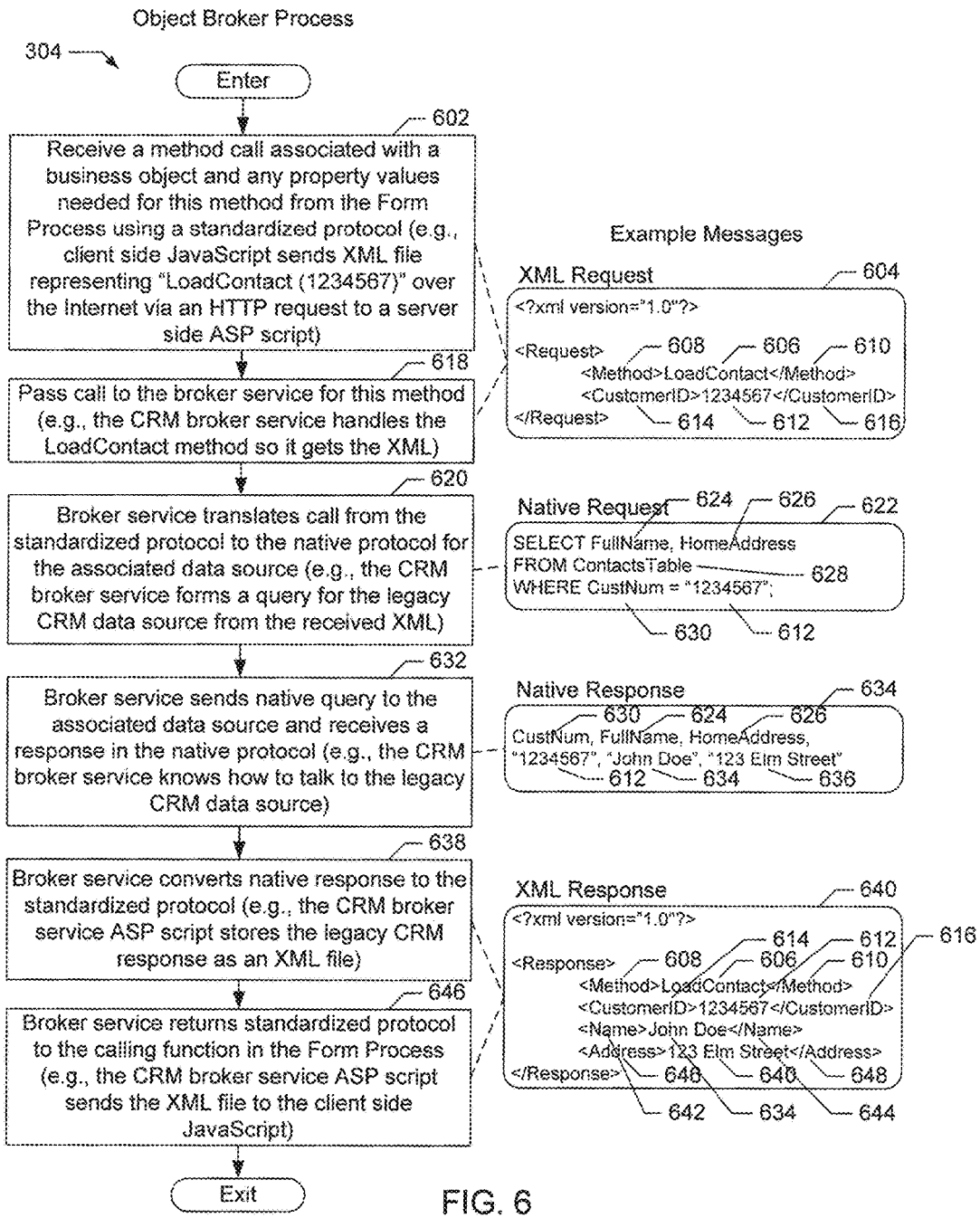
FIG. 6 is a flowchart of an example object broker process.

A flowchart of an example object broker process 304 is illustrated in FIG. 6. Preferably, the object broker process 304 is embodied in one or more software programs which is stored in one or more memories and executed by one or more processors. For example, the object broker process 304 may be ASP code (or any other type of software) running on the object broker server 114. Although the object broker process 304 is described with reference to the flowchart illustrated in FIG. 6, it will be appreciated that many other methods of performing the acts associated with object broker process 304 may be used. For example, the order of many of the steps may be changed, and some of the steps described may be optional.

Generally, the object broker process 304 receives standardized method calls from the form process 326 and converts the standardized method calls into native method calls. The object broker process 304 then sends the native method calls to the associated data source(s) 108 and receives one or more native responses from the data source(s) 108. The object broker process 304 then converts the native response(s) to standardized response(s) and sends the standardized response(s) to the calling form process 326.

More specifically, the object broker process 304 receives a method call from the form process 326 using a standardized protocol (block 602). The standardized method call is associated with a business object and includes any property values (i.e., parameters) needed for this method. For example, a client device 102 may be displaying the customer orders page 302 as an HTML document. Using an onBlur event trigger, the client device 102 may run JavaScript code that sends an XML file 604 representing "LoadContact (1234567)" over the Internet 116 via an HTTP request to an ASP script running on the object broker server 114. It will be appreciated that any suitable protocols may be used instead of HTML, JavaScript, XML, HTTP, and/or ASP. For example, VBScript may be used instead of JavaScript, and Perl may used instead of ASP.

The example XML request 604 includes the "LoadContact" method call 606 delimited by an opening "Method" tag 608 and a closing "Method" tag 610. In addition, the example XML request 604 includes the "CustomerID" property value 612 delimited by an opening "CustomerID" tag 614 and a closing "CustomerID" tag 616.

The object broker process 304 then passes the standardized method call to the broker service associated with the method call (block 618). For example, the object broker process 304 may send the XML file 604 containing the LoadContact method 606 call to the CRM broker service 330.

The broker service associated with the method call then translates the method call from the standardized protocol to the native protocol for the associated data source 108 (block 620). For example, the CRM broker service 330 may form a native request 622 for the CRM data source 316 from the received XML file 604. The native request 622 may use any protocol. For example, the native request 622 may be a SQL query that knows the CRM data source 316 holds the customer contact data in a "FullName" field 624 and a "HomeAddress" field 626 of a "ContactsTable" 628 indexed by a "CustNum" field 630.

The broker service associated with the method call then sends the native query to the associated data source 108 and receives a native response from the data source 108 (block 632). For example, the CRM broker service 330 may be an ASP script running on the object broker server 114 that sends the native request 622 to the CRM data source 316 as a SQL query and receives a native response 634 in the form of a comma-delimited list. In this example, the native response 634 includes the name value 634 and the address value 636 of the contact associated with the "CustomerID" property value 612.

The broker service then converts the native response back to the standardized protocol (block 638). For example, the CRM broker service 330 may wait for a SQL response from the CRM data source 316 and generate an associated XML response 640. In this example, the XML response 640 includes all of the information from the original XML request 604 (i.e., the "LoadContact" method call 606 delimited by an opening "Method" tag 608 and a closing "Method" tag 610 and the "CustomerID" property value 612 delimited by an opening "CustomerID" tag 614 and a closing "CustomerID" tag 616). In addition, the XML response 640 includes the name value 634 delimited by an opening "Name" tag 642 and a closing "Name" tag 644, as well as the address value 640 delimited by an opening "Address" tag 646 and a closing "Address" tag 648.

The broker service then sends the standardized response to the calling function in the form process 326 (block 646). For example, the CRM broker service 330 may send the XML response 640 to a JavaScript associated with the customer orders page 302 on a client device 102. As described below, the form process 326 may then use the XML response 640 to populate the HTML based customer orders page 302.

Figure 7:
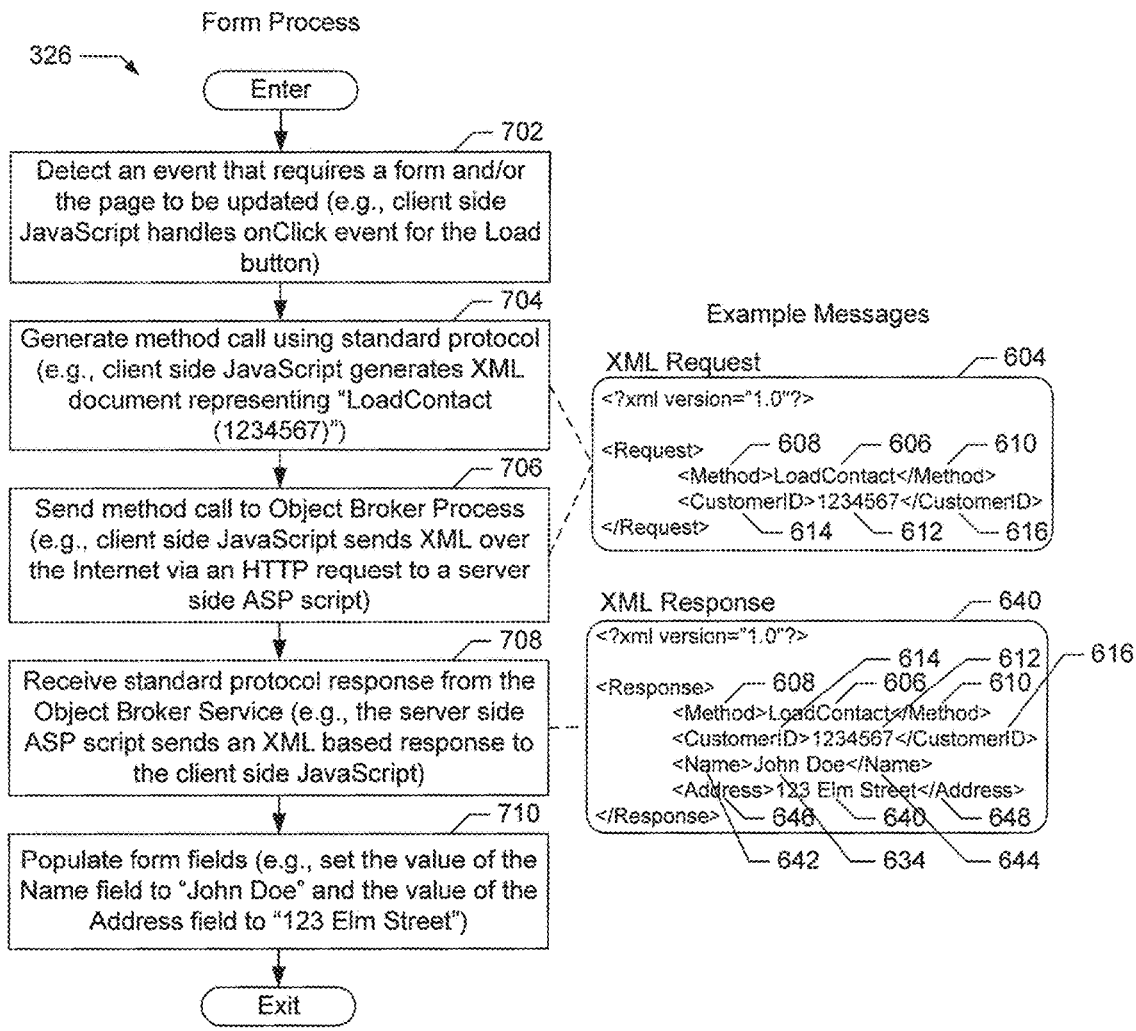
FIG. 7 is a flowchart of an example form process.

A flowchart of an example form process 326 is illustrated in FIG. 7. Preferably, the form process 326 is embodied in one or more software programs which is stored in one or more memories and executed by one or more processors. For example, the form process 326 may be JavaScript code (or any other type of software) running on a client device 102. Although the form process 326 is described with reference to the flowchart illustrated in FIG. 7, it will be appreciated that many other methods of performing the acts associated with form process 326 may be used. For example, the order of many of the steps may be changed, and some of the steps described may be optional.

Generally, the form process 326 detects events associated with a form (e.g., the HTML customer orders page 302) and sends standardized method calls (e.g., XML request 604) to the object broker process 304. When the form process 326 receives the standardized response(s) (e.g., XML response 640) back from the object broker process 304, the form process 326 may then use the standardized response(s) to populate the form (e.g., the HTML customer orders page 302).

More specifically, the form process 326 detects an event that requires a form and/or page to be updated (block 702). For example, the form process 326 may be JavaScript code running on a client device 102 in association with the customer orders page 302. When a user presses the load button 502 on the customer contact form 310, the form process 326 detects the onClick event associated with the load button 502 and executes a portion of the JavaScript code associated with this onClick event (i.e., the event handler).

When the event handler is executed, the form process 326 generates a suitable method call in the standard protocol (block 704). For example, the client device 102 may run JavaScript code that generates the XML file 604 representing "LoadContact(1234567)". As described above, the example XML request 604 includes the "LoadContact" method call 606 delimited by an opening "Method" tag 608 and a closing "Method" tag 610. In addition, the example XML request 604 includes the "CustomerID" property value 612 delimited by an opening "CustomerID" tag 614 and a closing "CustomerID" tag 616.

The form process 326 then sends the standardized method call to the object broker process 304 (block 706). For example, the client device 102 may send the XML request 604 over the Internet 116 via an HTTP request to an ASP script running on the object broker server 114. The object broker process 304 then communicates with the associated data sources 108 using the native protocols and sends the form process 326 a standardized response (block 708). For example, the client side JavaScript associated with the form process 326 may receive the XML response 640 from the server side ASP script associated with the object broker process 304.

As described above, the example XML response 640 includes all of the information from the original XML request 604 (i.e., the "LoadContact" method call 606 delimited by an opening "Method" tag 608 and a closing "Method" tag 610 and the "CustomerID" property value 612 delimited by an opening "CustomerID" tag 614 and a closing "CustomerID" tag 616). In addition, the XML response 640 includes the name value 634 delimited by an opening "Name" tag 642 and a closing "Name" tag 644, as well as the address value 640 delimited by an opening "Address" tag 646 and a closing "Address" tag 648. The form process 326 may then use the standardized response to populate the client's form (block 710). For example, the client side JavaScript may populate the name field 506 and the address field 508 of the HTML based customer contact form 310.

Figure 8:
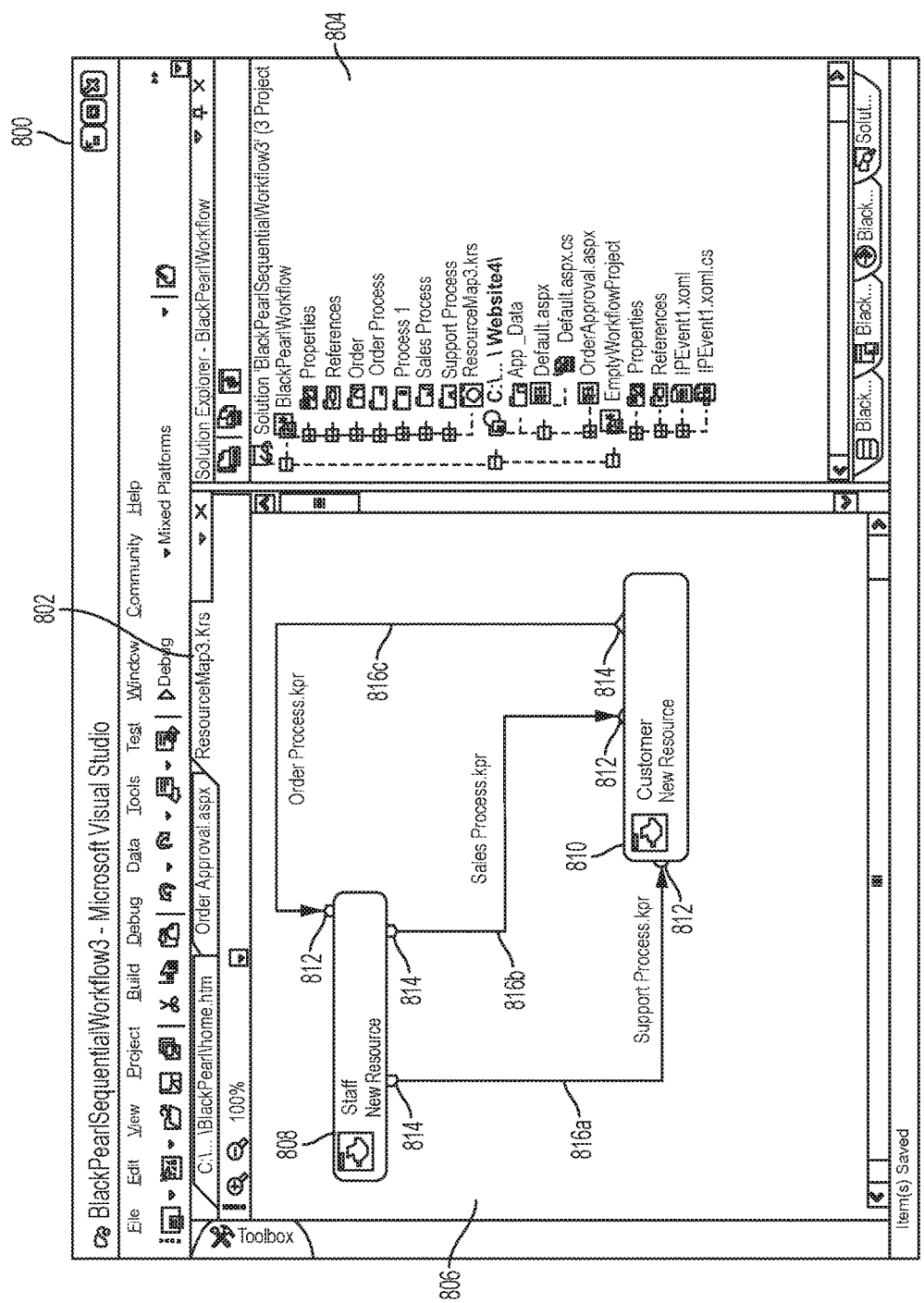
FIG. 8 is a screenshot of an example workflow design tool that allows a user to define a resource map.

A workflow design tool 800 that allows a user to define a resource map 802 is illustrated in FIG. 8. In this example, the workflow design tool 800 includes a file explorer section 804 and a design canvas 806. The file explorer section 804 allows the user to find and organize a plurality of files associated with the work flow. The design canvas 806 allows the user to draw a graphical representation of the resource map 802. In this example, a resource map 802 is shown that includes a staff object 808 and a customer object 810. The staff object 808 and the customer object 810 each include one or more input nodes 812 and one or more output nodes 814. Input nodes 812 are connected to output nodes 814 by process arrows 816. In this example, a support process 816a and a sales process 816b each come out of the staff object 808 and into the customer object 810. Similarly, an order process 816c comes out of the customer object 810 and into the staff object 808.

By defining workflows in terms of known resources (e.g., the staff object 808 and the customer object 810) and the interactions between those resources (e.g., the customer object 810 needs support from the staff object 808), the workflow designer can discover and design each process by starting at a high level and drilling down to underlying processes and automated workflows.

The resource maps 802 also allow for business object inheritance to show classes of a business object and that business object's child objects. Child objects may be associated with parent objects by modifying properties associated with the parent object and/or adding properties to the parent object. A single parent/child object combination might have a unique link definition within another resource on the canvas. For example, the parent customer object 810 may include a government customer child object and a commercial customer child object. The sales process 816b between the staff object 808 and the customer object 810 may be different depending on the type of customer object 810 (i.e., one sales process 816b for government customer's 810 and another sales process for commercial customers 810). Similarly, the staff object 808 may be a parent object with sales staff and support staff as two child resources.

Figure 9:
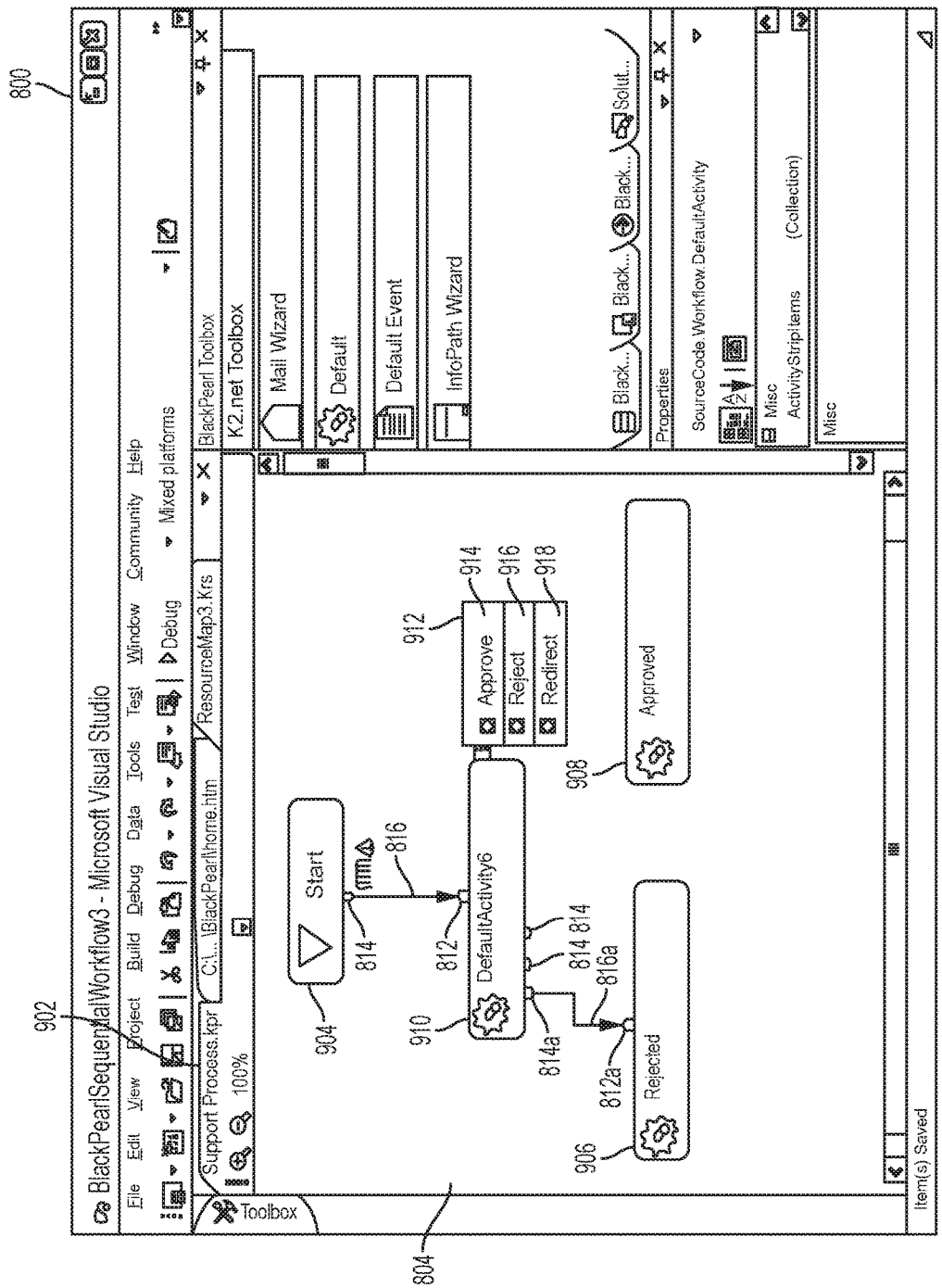
FIG. 9 is a screenshot of an example workflow design tool that allows a user to define a process map.

Another view of the workflow design tool 800 is illustrated in FIG. 9. In this view, the workflow design tool 800 is used to create a process map 902. In this example, the support process 816a is being defined. The example support process 816a includes a start step 904, a rejected step 906, and an approved step 908. In this example, only one of these steps 904, 906, 908 is to be performed. Accordingly, a new step 910 is being placed to select one of the three steps 904, 906, 908. The new step 910 includes a plurality of actions 912 and a plurality of corresponding output nodes 814. In this example, the new step 910 includes an approve action 914, a reject action 916, and a redirect action 918. The user connects the rejected output node 814a to the input node 812a of the rejected step 906 by dragging the process connector 816d. The associated line logic is automatically configured for the user.

Figure 10:
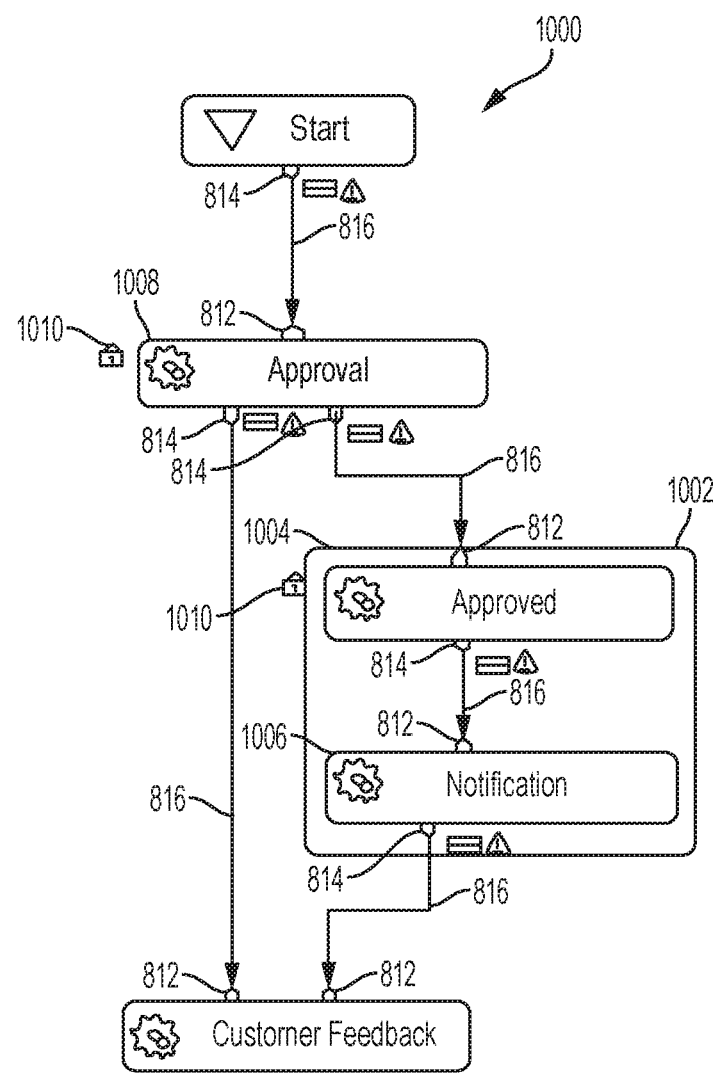
FIG. 10 is an example process map with a localized region of the process map highlighted.

Another process map 1000 is illustrated in FIG. 10. In this example process map 1000, a portion 1002 of the process map 1000 is highlighted. Specifically, an approved step 1004 and a notification step 1006 are included in a highlighted portion 1002. This portion 1002 may define a localized region of the process map 1000 while other portions of the process map 1000 (e.g., the rest of the process map 1000 in this example) are considered global regions. Using process inheritance, this localization of certain process regions allows a process owner to stay in control of the global process and still allow other users to customize certain portions 1002. For example, the global process may determine when something is approved and where the notification is routed, but one office in an organization may perform one set of actions in response to the approval and another office in the organization may perform another set of actions in response to the approval. Local processes may even include additional process steps that are specific to the localized region. The process 1000 is maintained under a single process definition such that changes to the global portion are automatically applied to all instances of the process 1000 and changes to the local portion 1002 are only applied to the associated localities.

In addition, individual process steps and/or portions 1002 may be locked. In this example, an approval step 1008 is individually locked, and the local portion 1002 is also locked. Each locked step and each locked portion includes a lock icon 1010 to indicate a locked status. By locking a process step 1008 and/or a process portion 1002, process designers can limit another user's ability to change certain configuration settings, add or remove dependencies, etc. from the defined and locked logic. The locking attributes can also be manipulated by wizards and templates in a programmatic way, allowing lower level building blocks to hide or lock their implementation logic.

A collaborative framework allows any process designer working within the workflow design tool 800 to visually share his design canvas 806 with another user across the network 116. A process designer can also initiate a voice or text conversation with the other parties to discuss the process currently being designed. In this manner, the process designer may involve other users in the process design using collaboration and application sharing tools. For example, by right clicking on the design canvas 806, the process designer may contact a particular person in the accounting department to ask that person who should be notified when a purchase is approved. Text messages and/or voice recordings between collaborators may also be saved to a database for later review. For example, when a process is being evaluated for redesign, the process designer may listen to a collaboration conversation to determine why a particular step was implemented the current way.

Figure 11:
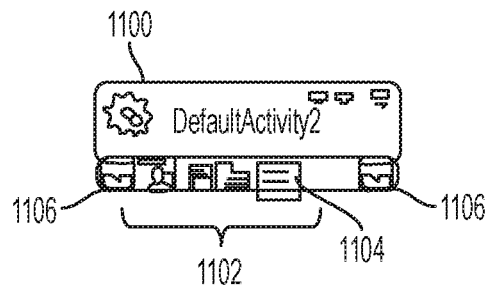
FIG. 11 is a screenshot of an example activity strip.

Each step in the graphical representation of process preferably includes an activity strip. An example activity strip 1100 is illustrated in FIG. 11. In this example, the activity strip 1100 includes one or more event icons 1102 that represent the events associated with the process step. For example, the user may drag a send e-mail event into a process step. In such an instance, an e-mail event icon 1104 is added to the activity strip 1100. If the number of event icons 1102 exceeds the width of the activity strip 1100, the user may scroll through event icons using arrow buttons 1106.

Figure 12:
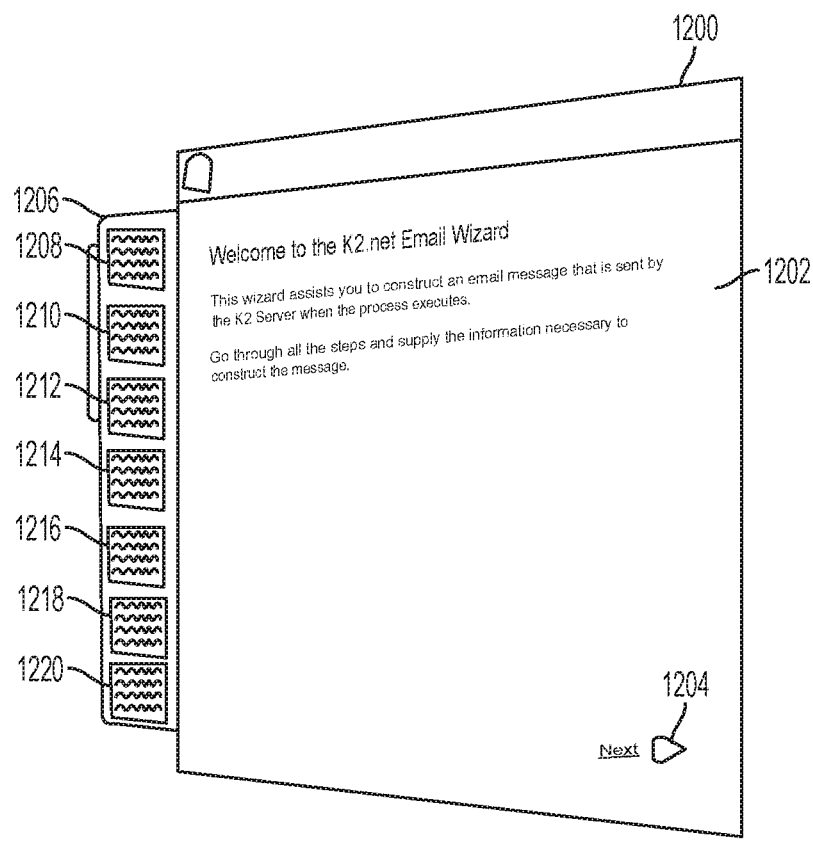
FIG. 12 is a screenshot of an example setup wizard in a partially rotated state.
Figure 13:
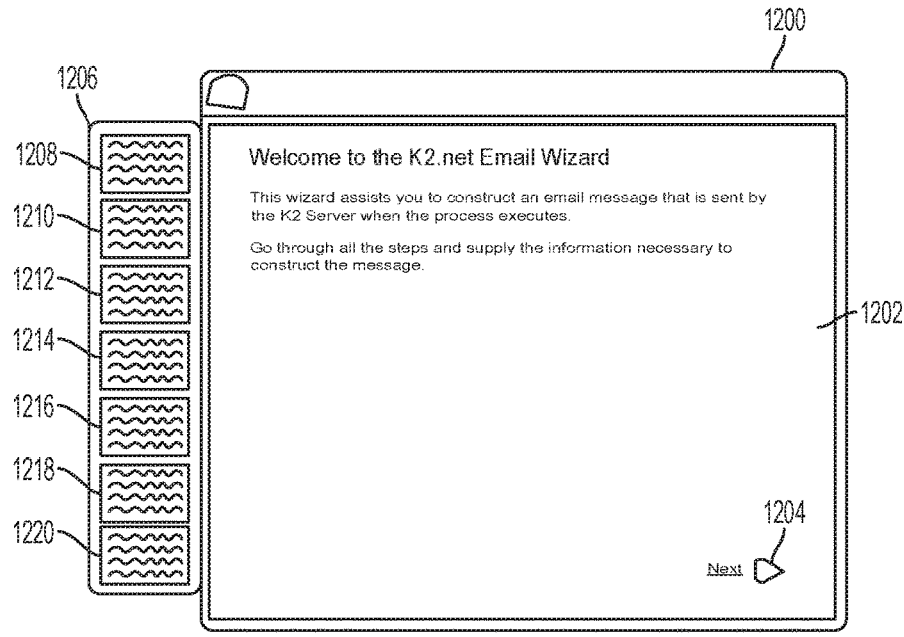
FIG. 13 is a screenshot of the example setup wizard in a fully rotated state.

When a particular event icon 1102 is selected, the user is shown a setup wizard to configure that portion of the process. Preferably, each step in a process is presented as a cube to the user, and the setup wizard is swiveled into view to create an effect of a single entity that the user is working on. For example, when a user presses the e-mail event icon 1104, the activity strip 1100 rotates into an e-mail event setup wizard 1200. A partially rotated view of an example e-mail event setup wizard 1200 is illustrated in FIG. 12. A fully rotated view of the same setup wizard 1200 is illustrated in FIG. 13. The e-mail setup wizard 1200 may be used to design dynamically constructed e-mails used by one or more workflow processes. For example, the notification step 1006 of the approval process 1000 illustrated in FIG. 10 includes an output 814 that may be an automatic e-mail message. The e-mail setup wizard 1200 may be used to design how that e-mail message is constructed.

Preferably, the setup wizard 1200 includes a main display portion 1202 and a next button 1204. The main display portion 1202 displays one page of the setup wizard 1200. The next button 1204 advances the main display portion 1202 to the next page of the setup wizard 1200. A previous button (not shown) changes the main display portion 1202 to display the previous page of the setup wizard 1200.

The setup wizard 1200 also includes a page palette 1206. The page palette 1206 includes a plurality of thumbnails 1208 to 1220. Each of the thumbnails 1208 to 1220 represents one of the pages in the setup wizard 1200. The user may quickly jump to any page in the setup wizard 1200 by clicking the associated thumbnail. When a user jumps to a particular page in the setup wizard 1200, the main display portion 1202 is redrawn to reflect that page.

Figure 14:
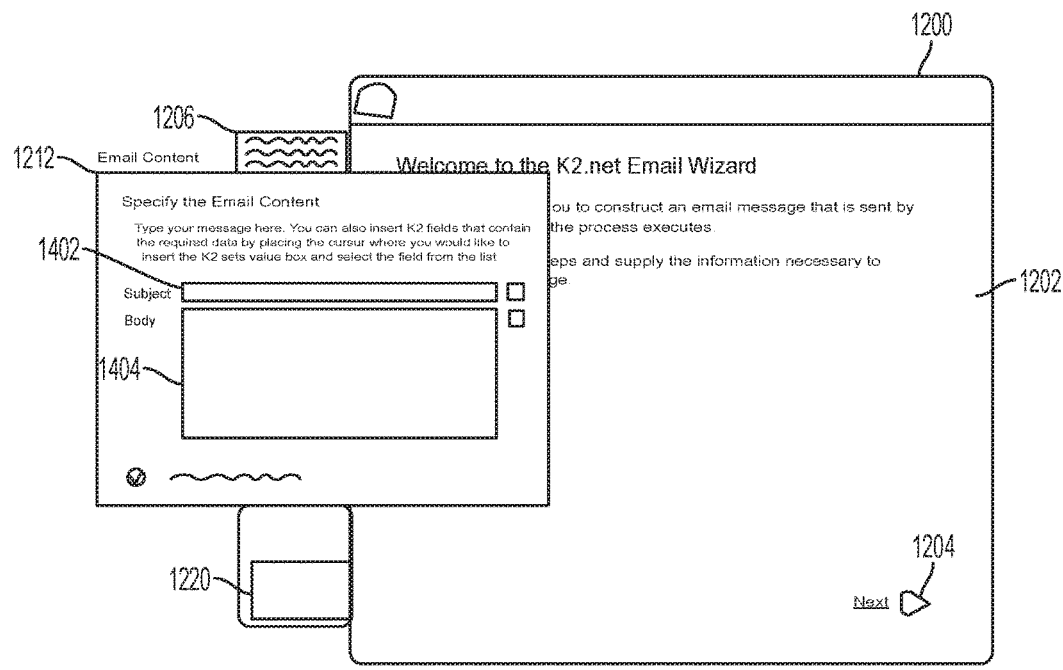
FIG. 14 is a screenshot of the example setup wizard with a popup window.

In addition, the user may quickly view a popup of any page in the setup wizard 1200 without jumping to that page (i.e., without drawing the page contents in the main display portion 1202) by hovering a cursor over the associated thumbnail. For example, the third page 1212 of the example e-mail setup wizard 1200 is displayed as a popup in FIG. 14. In this example, the third page 1212 of the setup wizard 1200 includes a subject input box 1402 and a body input box 1404. The subject input box 1402 of the e-mail setup wizard 1200 is used to define the subject line of the automatic e-mail. The body input box 1404 of the e-mail setup wizard 1200 is used to define the body of the automatic e-mail. Any values entered into a page of the process setup wizard 1200 are visible in the popup view. For example, if the user had entered "Approval Report" in the subject input box 1402 of the third page 1212 of the e-mail setup wizard 1200, "Approval Report" would be visible in the subject input box 1402 of the popup window. In this manner, the user can enter values on different pages of the setup wizard 1200 that are consistent with other entries without the need to remember those other entries and/or leave the current page.

Figure 15:
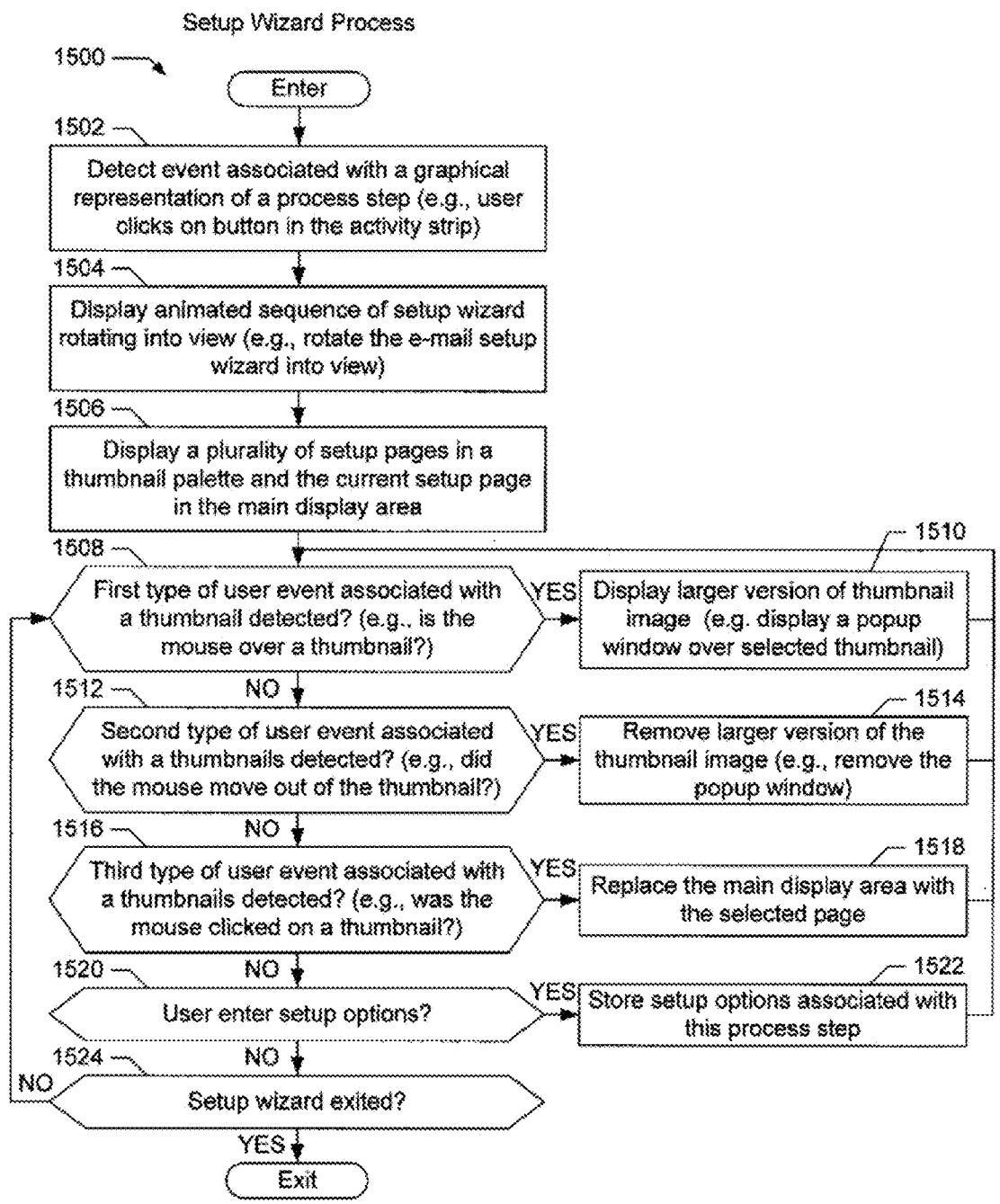
FIG. 15 is a flowchart of an example setup wizard process.

A flowchart of an example setup wizard process 1500 is illustrated in FIG. 15. Preferably, the setup wizard process 1500 is embodied in one or more software programs which is stored in one or more memories and executed by one or more processors. Although the setup wizard process 1500 is described with reference to the flowchart illustrated in FIG. 15, it will be appreciated that many other methods of performing the acts associated with setup wizard process 1500 may be used. For example, the order of many of the steps may be changed, and some of the steps described may be optional.

The process 1500 begins when a client device 102 detects an event associated with a graphical representation of a process step 1008 (block 1502). For example, the user may click on a setup button in the activity strip 1100. In response, the client device 102 causes an animated sequence to be displayed (block 1504). For example, the client device may display the activity strip rotating in three dimensions to show an e-mail setup wizard "side" of a cube. In this manner, the user is given visual feedback that the two objects (e.g., the activity strip 1100 and the e-mail setup wizard 1200) are related.

The setup wizard includes a plurality of setup pages in a thumbnail palette 1206 and a current setup page in a main display portion 1202 (block 1506). For example, the first page of an e-mail setup wizard may ask the user to enter the e-mail address of the recipient and the subject of the e-mail message. While the client device 102 is displaying setup wizard pages and receiving setup information from the user, the client device 102 is also looking for a plurality of events such as mouse movements and mouse clicks.

If a first type of event associated with one of the thumbnail images 1208-1220 is detected (block 1508), the client device 102 preferably displays a larger version of the associated thumbnail image (block 1510). For example, if the user moves the mouse cursor over a particular thumbnail image 1208-1220, a popup window 1212 showing a larger version of that thumbnail image may be displayed. Preferably, the larger version of the thumbnail image is a separate window 1212 that is smaller than the main display portion 1202 (see FIG. 14). However, any type of suitable image may be used. For example, the larger version of the thumbnail image may "temporarily" replace the main display portion 1202.

If a second type of event associated with one of the thumbnail images 1208-1220 is detected (block 1512), the client device 102 preferably removes the larger version of the associated thumbnail image (block 1514). For example, if the user moves the mouse cursor out of a particular thumbnail image, the popup window showing the larger version of that thumbnail image may be removed. If the larger version of the thumbnail image is a separate window, that window is removed from the display the content "beneath" the removed window is redraw. If the larger version of the thumbnail image replaced the main display portion 1202, then the previous contents of the main display portion 1202 (e.g., the current setup page) is redraw in the main display portion 1202.

The larger version of the thumbnail image also shows any setup information previously entered by the user. For example, if the user entered the recipients e-mail address on the first page of the setup wizard, moved to another page of the setup wizard, and then wanted to recall the entered e-mail address without scrolling all the way back to the first page, the user may simply roll the mouse over the first thumbnail to recall the entered information.

If a third type of event associated with one of the thumbnail images 1208-1220 is detected (block 1516), the client device 102 preferably replaces the main display image with a full size version of the associated thumbnail image (block 1518). For example, if the user clicks the mouse on a particular thumbnail image, the main display portion 1202 preferably jumps to that page in the setup wizard. Unlike the mouse over example, removing the mouse from the thumbnail does not revert the main display portion 1202 to the previous page (i.e., the user has moved to that setup page as opposed to just temporally reviewing that setup page).

At any time, the user may enter one or more setup options (block 1520), and the setup options are stored (block 1522). If the user exits the setup wizard (block 1524), the process 1508-1520 of checking for user actions and setup options repeats.

Mobile Application Engine for Native Mobile Applications

With the proliferation of mobile devices (e.g., smartphones), users are increasing the amount of business done on or using a mobile device. Tasks that were performed on traditional stationary desktop computers, laptop computers or home computers (collectively, personal computers or "PCs") are often performed on handheld mobile devices.

Typically, forms are accessed via a web browser on a PC. Users may wish to access business forms via mobile devices. However, the user experience of accessing forms on mobile devices is unsatisfactory. Basic HTML rendering of a form may allow for the form to be available on a mobile device, but the user experience of accessing the form via HTML on a mobile device is deficient. If the PC definition of the form is accessed on the mobile device, the user may face a difficult time viewing and interacting with the form. Some mobile browsers may be able to render the PC definition of the form on the mobile device and translate the form to a mobile format, allowing the text to be more viewable than if the PC form were not translated to mobile format at all. However, not all of the capabilities and functionalities of the form may be available on the mobile device. And, the user may not be able to use the native control features or operating system of the mobile device in viewing and interacting with the form.

A much better user experience is had if the content or form provider develops a native application for the mobile device. However, there are a multitude of different mobile devices, with different screen sizes, operating systems, capabilities, etc. It is expensive to develop a native mobile application for each target mobile platform or operating system.

For example, a bank may use a forms technology to develop a form and make the form accessible to a user on a PC. The user can perform traditional banking tasks using the PC. A user may wish to access the form on a mobile device through a mobile browser. The mobile browser may be able to display the form, but may not be able to offer a full feature set. For this reason, the bank may also write and offer a native mobile application. Using the native mobile application, the user can better access his or her bank data and interact with the data. The mobile application may have several advantages over accessing the form through the mobile browser.

For example, the bank may allow the user to electronically deposit a check. On the PC, the PC form definition may allow the user to attach a scanned photo of the check. The mobile browser, however, may not have an "attach" capability due to a difference in the file structure of the mobile operating system. To allow such features, the bank must develop a native mobile application that can use a native function that allows taking a photo of a check using the mobile device's camera or allows using a photo already stored in the mobile phone. Thus, the bank must develop a mobile application for each target mobile platform, because the mobile browser cannot offer the full feature set of the PC form, such as attaching a check, and cannot use the native controls of the mobile device, such as taking a photograph with the built-in camera.

However, developing a native mobile application for each target mobile operating system is expensive. A developer must have extensive knowledge about a target mobile operating system to develop an application for that target mobile operating system.

Also, a native application must be developed for each form that is to be made available as an application on all of the different target mobile operating systems. Using a developer to write a native application for each form for each target mobile operating system is time-consuming, expensive and is not an option that is readily available.

The presently disclosed mobile application engine translates a form into a native mobile application targeted for a specific mobile platform, e.g., Apple iOS®, Google Android®, Microsoft Windows 8®, or Blackberry OS®. Some existing technologies, such as U.S. Pat. No. 8,365,203, translate user interface elements and render HTML as native controls. Others, such as U.S. Patent Pub. No. 2011/0154305 and U.S. Patent Pub. No. 2012/0159310, convert HTML markup to a native application for a mobile device and perform mapping of a form to a mobile device. Still others, such as PhoneGap or Apache Cordova®, develop hybrid applications that use HTML as a rendering technology within a browser. However, simply mapping or rendering HTML as is done in the prior art is unsatisfactory. And, many existing technologies still require additional steps such as further programming of a form or publishing each application to an application store for download before the application can be made available on a mobile device.

The presently disclosed mobile application engine receives a form document and outputs a mobile application that uses native controls of the mobile device without requiring any specialized programming knowledge on part of the mobile device user or the forms developer.

Figure 16:
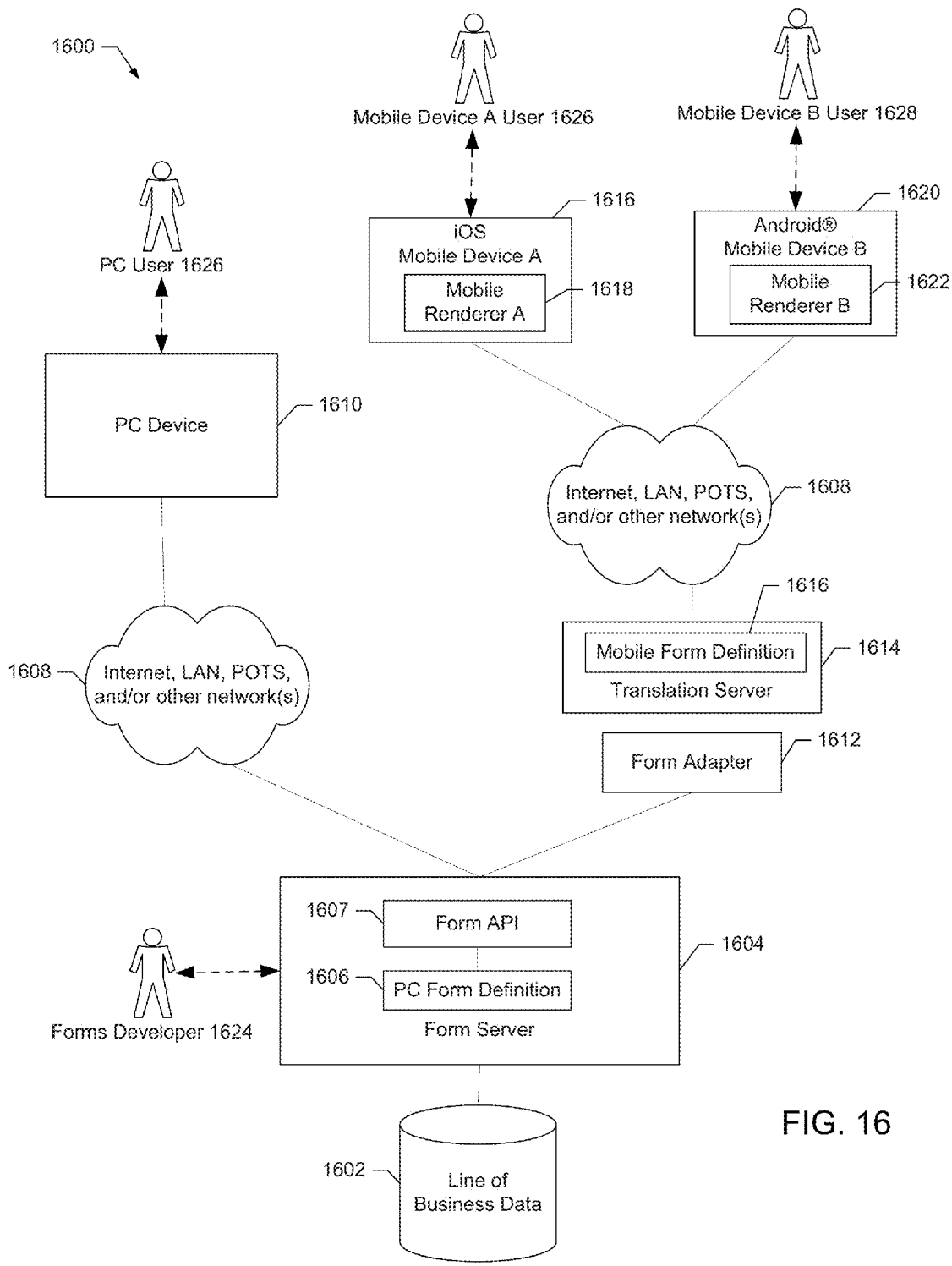
FIG. 16 is a block diagram showing an example architecture of a mobile application engine, according to an example embodiment of the present invention.

Referring now to FIG. 16, FIG. 16 illustrates a network diagram 1600 for producing forms and native mobile applications. Database 1602 represents one or more line-of-business systems that contain data that may be read, created, updated or deleted via a form. Form server 1604 represents a form technology server, such as, for example, Adobe® Form Server, Adobe® LiveCycle Designer, or Microsoft® Office Forms Server. An example of the forms technology implemented by form server 1604 may be forms offered by the assignee of the present application, such as, for example, K2® smartforms. Alternatively, form server 1604 may be a custom proprietary form solution.

Form server 1604 maintains and delivers a form definition 1606 for a specific platform. For example, the form server may manage a form definition for a PC. The form definition contains a form layout (e.g., views, tabs, tables, controls, authentication, etc.), rules, expressions, validations, events, actions and data bindings. Alternatively, form server 1604 maintains form definitions for multiple target platforms.

It should be appreciated that a user 1624 familiar with developing forms technologies may wish to make a form available to PC user 1626 for interacting with data stored in database 1602. For example, forms developer 1624 may wish to provide PC user 1626 a form to create, read, update, or delete data in database 1602. Forms developer 1624 develops and makes available a PC form definition 1606 that can be rendered onto PC device 1610.

The forms developer 1624 may wish to make the form available as a mobile application on a variety of different mobile operating systems. However, as discussed above, the same form is not suitably accessible on mobile devices for mobile users. The presently disclosed mobile application engine translates the PC form definition into a form that can be rendered by the mobile devices as a mobile application that uses native mobile controls and features.

A mobile renderer is developed for each target mobile operating system. For example, a mobile renderer is developed for iOS and Android. The mobile renderer works in conjunction with a translation server and a form adapter, described below. For example, mobile renderer A 1618 is developed for mobile device A 1616 running iOS, and mobile renderer B 1622 is developed for mobile device B 1620 running Android. Mobile renderers A and B are installed on mobile devices A and B, respectively.

Form adapter 1612 accesses form definition 1606 using form API 1607. Form API 1607 is a form application programming interface that provides programmatic access to form definition 1606. In one embodiment, the form API 1607 accesses the form server 1604. The form API 1607 may access the form server 1604 to determine whether the data bindings can be made available offline. In certain cases, the form adapter writer may know that the form API 1607 must interrogate the form server 1604 for required information.

Form adapter 1612 translates form definition 1606, which again is a definition that is written so as to be understood by PC device 1610, and maps elements of the form 1606 into translation server interfaces, described below. Elements of the form 1606 that are translated and mapped by form adapter 1612 include, without limitation, the layout, views, controls, expressions, validations, events, actions, authentication and data bindings that make up the form definition 1606. Data bindings include information about whether data in database 1602 may be made available to a device even when the mobile device is offline. Accessing and interacting with data offline may be advantageous because the user can use the form even if offline or when network connectivity is intermittent. A browser-based form, in contrast, may not be used on the mobile device if the mobile device is offline. The mobile application engine can understand the difference between offline and online data, thus providing the capability to either preload relational data on the device, or load data on demand if needed or when coverage is good enough. It should therefore be appreciated that the mobile device user can use forms offline (if the particular scenario allows offline use) and then submit information to the database 1602 at a later time.

Translation server 1614 receives the elements of the form 1606 from the form adapter 1612. The translation server 1614 is built to accept the various elements of the form 1606. The translation server 1614 includes a variety of interfaces, one for each element type that is expected. Thus, a developer may need to develop a translation server 1614 that can accept form elements. Translation server 1614 uses the form adapter 1612 to build elements of the mobile form definition, such as a layout (views, tabs, tables, controls, etc.), rules, expressions, validations, events, actions, authentication and data bindings.

It should thus be appreciated that the translation server 1614 receives elements defining a PC form and generates corresponding elements defining a mobile form. The translation server 1614 in one embodiment also manages data and any associated processes (rules, events, actions) in a transaction so that all captured information is saved as one transaction to reduce network traffic and allow for offline scenarios, rather than piece by piece or at different stages.

In one embodiment, translation server 1614 runs on .NET (e.g., ASP Rest API based application). Translation server 1614 consists of a message router system where adapters are loaded for translation.

Translation server 1614 outputs a mobile form definition 1616 that uses HTML5, XML and JavaScript to build a form definition that can be interpreted by a variety of mobile device renderers. The mobile form definition contains all the layout (views, tabs, tables, controls, etc.), rules, expressions, validations, events, actions, authentication and data bindings of the PC form in a self-expressed format. Thus, the payload output by the translation server 1614 also contains all the form elements that apply to the PC form. Although the present disclosure discusses mobile applications as exemplary, the engine can be extended to generate form definition payloads that can target a different technology or type of device.

As discussed earlier, mobile renderers are specific to an operating system and are installed on various mobile devices. A renderer is installed per device type, e.g., iOS-based iPhone or Android-based Samsung® S III. Each mobile renderer interprets the mobile form definition 1616 and renders the layout (views, tabs, tables, controls, etc.), rules, expressions, validations, events, actions, authentication and data bindings using the layout, controls, and scripting language of the particular mobile device and operating system. A mobile renderer can interpret data bindings and either preload relational data on the device or load data on demand if needed or when network connectivity permits.

Each mobile renderer can access the corresponding mobile device's storage or file system and native device functionality such as global positioning system ("GPS"), camera or phonebook via the native API, all by interpreting an HTML tag from the payload and transforming the HTML tag into a piece of native functionality. The renderer also builds the applications dynamically based on the design retrieved from the form server. It should thus be appreciated that the native mobile application renders on the mobile device fully functional and feature complete forms associated with the forms technology on form server 1604. The native mobile application also includes the relevant settings (to connect to form server 1604), security (login information, PIN-based timeout, remote wipe) and task lists (ability for users to view and interact with tasks on form server 1604 or another server).

The resulting mobile applications may be universal applications, meaning they are designed and built to be used on both phone and tablet devices for their respective operating systems.

As discussed above, form definition contains a form layout (e.g., views, tabs, tables, controls, etc.), rules, expressions, validations, events, actions, authentication and data bindings.

Translation server 1614 interprets any expressions that may be defined on a form such that they can be executed on the mobile platform. Table 1 illustrates an example table of expressions.

TABLE 1

Conversion (ToBoolean, ToDateTime, ToDecimal, ToNumber, ToText)
Date and Time (AddDays, AddHours, AddMinutes, AddSeconds, Day, DayDifference, EndOfMonth, EndOfQuarter, EndOfWeek, EndOfYear, FormatDateAndTime, Month, Now, StartOfMonth, StartOfQuarter, StartOfWeek, StartOfYear, SubtractDays, SubtractHours, SubtractMinutes, SubtractSeconds, Today, Tomorrow, WeekNumber, Weekday, Year, Yesterday)
List Aggregation (ListAverage, ListCount, ListMaximum, ListMinimum, ListSum)
Logical (And, Equals, GreaterThan, GreaterThanEquals, If, LessThan, LessThanEquals, Not, NotEquals, Or, Xor, False, True)
Mathematical (Absolute, FormatNumber, Power, Random, Root, RoundDown, RoundUp, Square, SquareRoot)
Operators (Divide, Minus, Modulus, Multiply, Plus, OpeningParenthesis, ClosingParenthesis)
Regular Expressions (Matches, Not Matches)
Text (Concatenate, Contains, Ends With, Find, Hyperlink, Insert, IsBlank, IsNotBlank, Join, Left, Length, Mid, PadLeft, PadRight, Proper, Replace, Right, StartsWith, ToLower, ToUpper, Trim, UrlDecode, UrlEncode, EmptyString)
Value Aggregation (Average, Maximum, Minimum, Sum)

Translation server 1614 must also understand a wide variety of control types. These controls may be implemented differently on different platforms (such as GPS controls, which may have more use on a mobile device than in a browser). Table 2 illustrates an example table of controls.

TABLE 2

Button
Calendar
Checkbox
Data Label
Dropdown List
File Attachment
Flow Renderer (Item View)
Grid (List View)
GPS
Hyperlink
Label
List Display
Lookup
MultiSelect Checkbox TABLE 2-continued Picker
Picture
Radio Button List
Rating
Slider
Text Area
Textbox
Toolbar
View Rules are made up of events and actions. The translation server 1614 should interpret events and actions such that each rule can be implemented on a mobile device. Table 3 illustrates an example table of events.

TABLE 3

Clear
Init
ListClick
ListDoubleClick
ListItemAdded
ListItemChanged
ListItemRemoved
ListRefresh
ListRowAdded
OnChange
OnDoubleClick
OnClick
Dynamic Control Events
Dynamic SmartObject Event Within a rule, once an event has fired, the rule contains one or more actions. The translation server 1614 should interpret these actions such that they can be executed on a mobile device. Table 4 illustrates an example table of actions.

TABLE 4

ApplyStyle
Execute
Execute Workflow
List
Calculate
Transfer
Close
Disable
Enable
Focus
Open
Popup
Prompt
Send Mail
Show Message
Validate The mobile applications should lay out the pages in a similar manner as their PC counterparts. However, the layout on the mobile device does not need to be an exact representation of the layout on the PC, as there may be beneficial layouts that differ between mobile devices and PCs. The mobile applications should provide full fidelity (from a layout perspective), including at least the following features:

Feature: Ability to render an "item view" accurately. This goes beyond the current "1 control per row" format, and should be able to handle multiple items per row (on tablet devices) and preserve the layout that was defined in the form.

Feature: Ability to render multiple views on the same page. Most forms comprise of more than one view, such as master/detail views. These could be either components of a single item (e.g., an invoice with a header section (item view), details section (list view) and footer section (item view)) which together makes up a single form that should be rendered on a single page. A mobile renderer developer should implement a practical solution for phones with less screen area than a PC (perhaps by allowing zooming into single views, or zooming out to see the entire form).

Feature: Ability to handle popup views/forms. For example, K2 Smartforms® allow forms to be reused as popups (along with rules that can transfer data to/from a subform, and can control the behavior such as when the subform/view is closed). Mobile applications developed by the mobile application engine may also handle popups as forms.

Feature: Ability to render tabs. For example, K2 Smartforms® allow supports multiple tabs within a single form. On tablets, these tabs may be rendered, whereas on phones, the tabs may appear on different screens. Again, the mobile renderer developer decides how best to implement the payload on phones and tablets.

Feature: Ability to render "system" forms such as the workflow view. For example, when a K2 Smartform® is used as a client step in a K2 workflow, the user has the option to use the workflow view in order to render workflow details such as the workflow name, activity and event name and the available actions. The mobile application also allows the user to use the workflow view in order to render workflow details, such as the workflow name, activity and event name and available actions.

Feature: The mobile application also supports workflow tasks such as redirecting the task, delegating the task, and "sleeping" the task.

It should thus be appreciated that the mobile renderer for each targeted operating system must be downloaded once for each mobile device. For example, iPhone user 1626 may download Mobile Renderer A from the Apple® App Store®. Android user 1628 may download Mobile Renderer B from GooglePlay®. Once the correct mobile renderer is installed on a mobile device, any form developed by forms developer 1624 is readily available as a native mobile application on that mobile device.

It should therefore be appreciated that mobile device users are required to download and install the renderer once from an application store associated with the mobile device's operating system. Thereafter, any form developed by forms developer 1624 can be made available to mobile device users 1626 and 1628 as a native application without the mobile device users having to download an "app" from an "app" store such as the Apple® App Store® for iPhones® or GooglePlay® for Android® mobile devices.

As described above, the mobile renderer in one embodiment translates a markup or payload. An example markup or payload includes:

Data Block (pre-cached data and relationships between data structures, and also templates to make the user interface ("UI") bindable to data structures), Rule Block (all the rules that apply to the UI and its backing data that needs to be run within the context of the form/form plus subforms), Expressions (may be similar to rules but used for calculations), Validations (all the validation rules that apply per control and on the form level), and UI Block (the UI that is rendered to output the mobile application).

The mobile application engine is also extensible in that it may be applied to a variety of existing off-the-shelf forms technologies. The mobile application engine supports multiple adapters and can thus translate a form to different formats for consumption on different technologies or platforms. For example, the mobile application engine can simultaneously pull data from disparate systems such as SAP or CRM seamlessly into one user interface or business form without the end user even knowing where the data is coming from or going to. Thus the mobile application engine allows any type of form technologies to be exposed to the translation server 1614 and allows mobilizing a variety of forms technologies.

FIG. 17 illustrates an example screen shot 1700 of an Expense Claim form. An employee can use the Expense Claim form to capture information about an expense claim to submit for reimbursement. A forms developer may wish to make the Expense Claim form available as a mobile application while retaining all of the features and functionality of the Expense Claim form. The form includes views, which are the building blocks for the form. Each view may be associated with an event, such as, view initialized, item clicked, view collapsed/expanded, etc. The form also includes buttons, such as Send Mail 1702, Notify 1704 and Submit 1706 along with Add 1708 and Delete 1710 on the Claims view 1714, which perform specific action code when clicked. The Claims view 1714 includes individual claims for the expense report and allows for management of the claims via Add and Delete buttons 1708 and 1710. The Employee Details view 1712 includes text boxes and a calendar control, described below. FIG. 17 also includes Expense History view 1716 and Comments view 1718.

Figure 18:
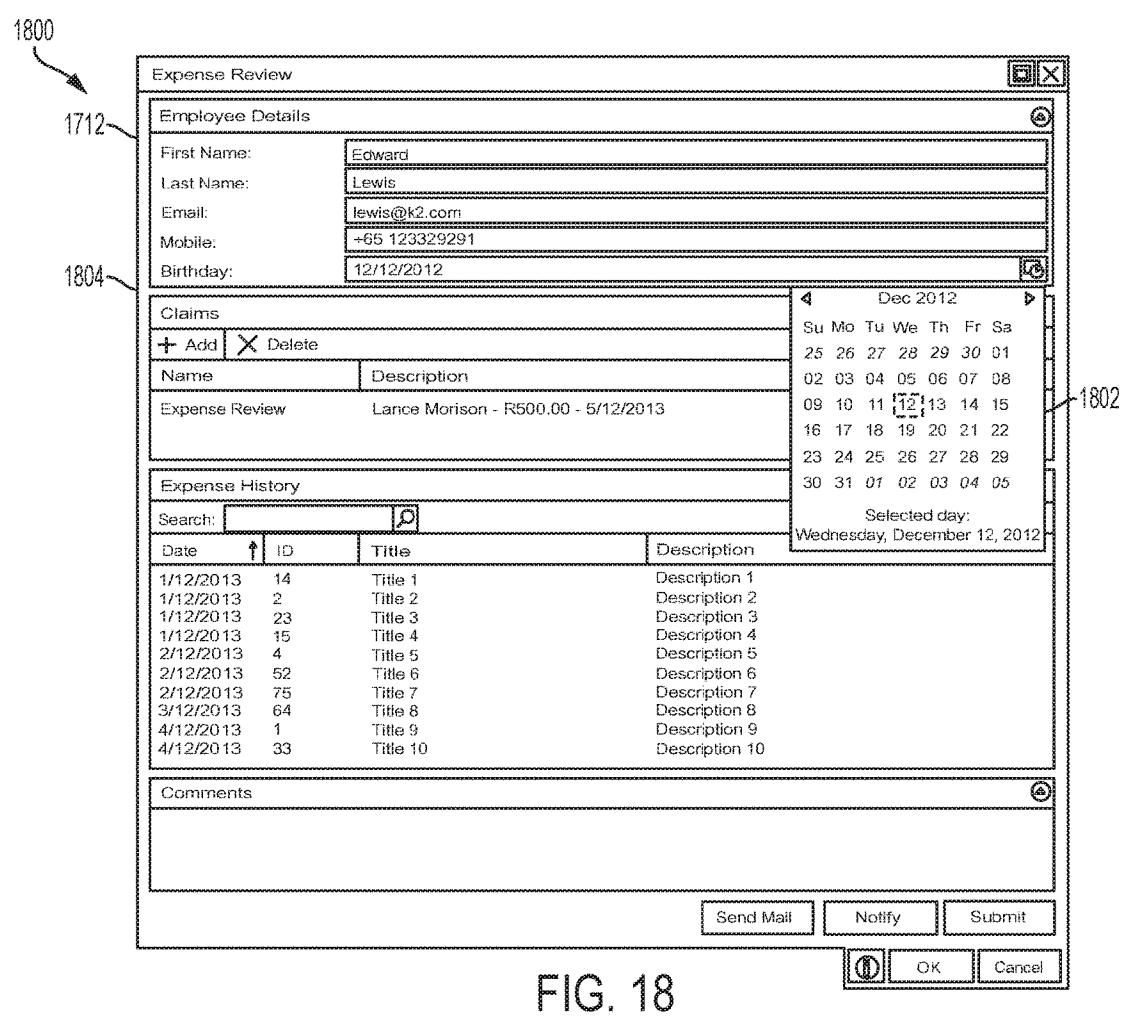

FIG. 18 illustrates another example screen shot 1800 of an Expense Claim form. As shown in FIG. 18, a calendar 1802 appears when the birthday field 1804 in the Employee Details view 1712 is clicked.

Figure 19:
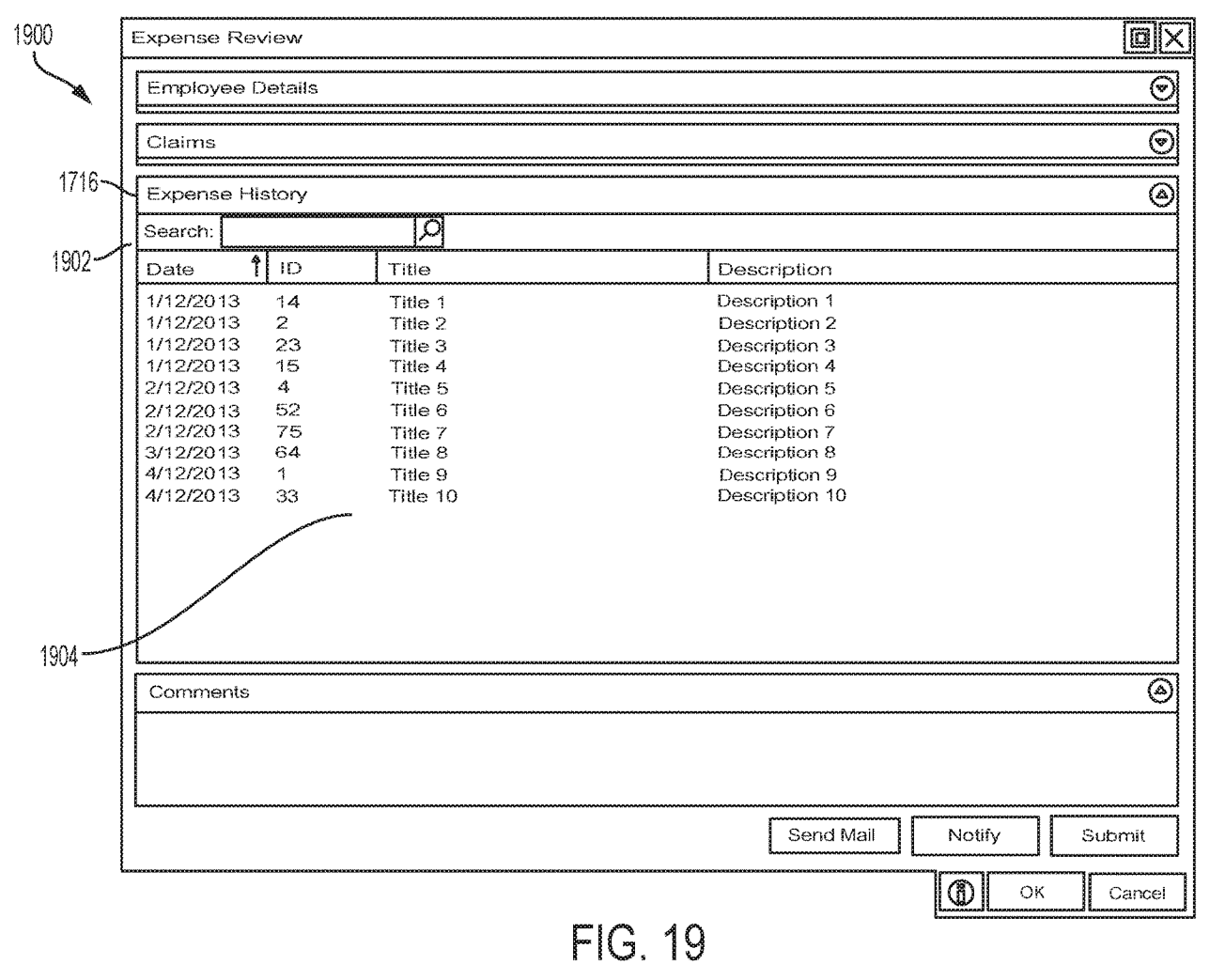
Figure 20:
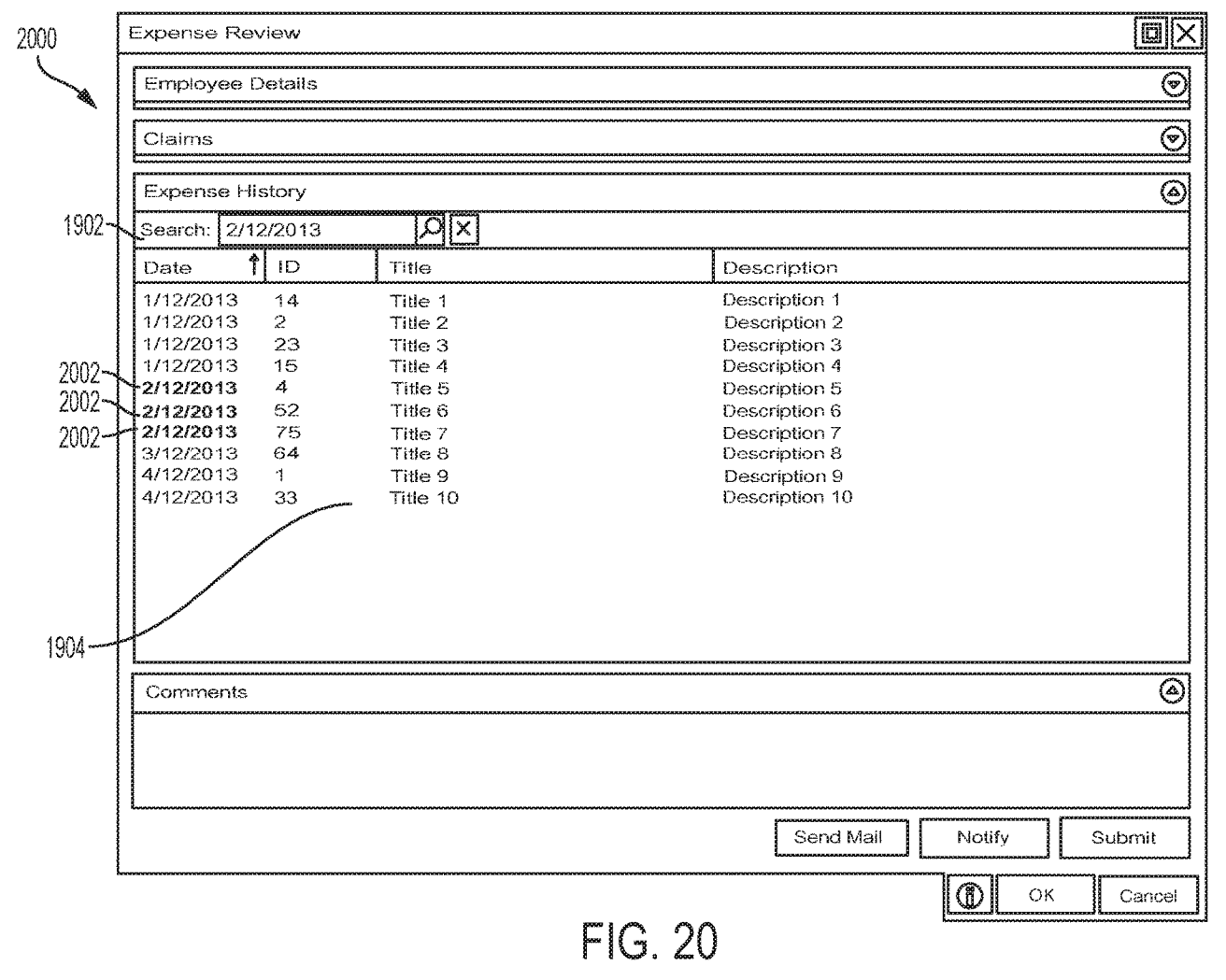

FIG. 19 illustrates another example screen shot 1900 of an Expense Claim form. The Expense History view 1716 in FIG. 19 includes a search box 1902 that allows for searching across the data in the history grid 1904. For example, as illustrated in FIG. 20 illustrating example screen shot 2000, the user has searched for "2/12/2013" in the search box 1902. All instancep2002 of "2/12/13" in the data in the history grid 1904 are highlighted.

Figure 21:
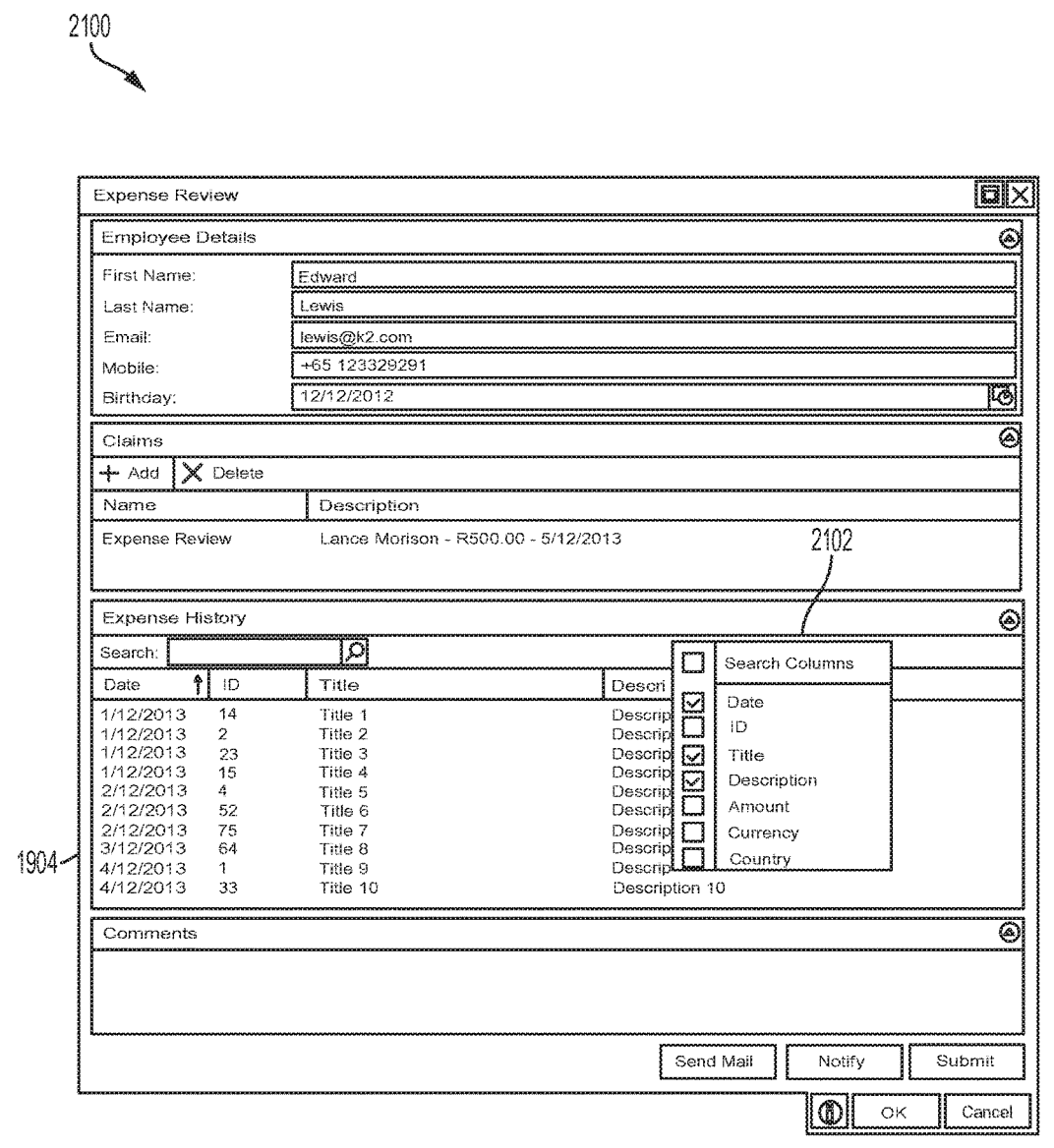

The Expense History grid 1904 supports the ability to change the columns that will be searched. For example, as illustrated in example screen shot 2100 in FIG. 21, selection box 2102 allows the user to select the columns of Expense History grid 1904 that will be searched.

The form illustrated in FIGS. 17 to 21 can be processed by the mobile application engine, resulting in a native mobile application for a target mobile operating system. The mobile application engine maps field sets (or views) and controls on the field sets, data blocks, rule sets and events to a declarative format that can be processed by each mobile device utilizing the native layout and controls of the device. FIGS. 22 to 32 illustrate example screen shots of a mobile application native to the Apple iOS® operating system that contains the full set of features available on the form and leverages the native features and controls of the target operating system.

Figure 22:
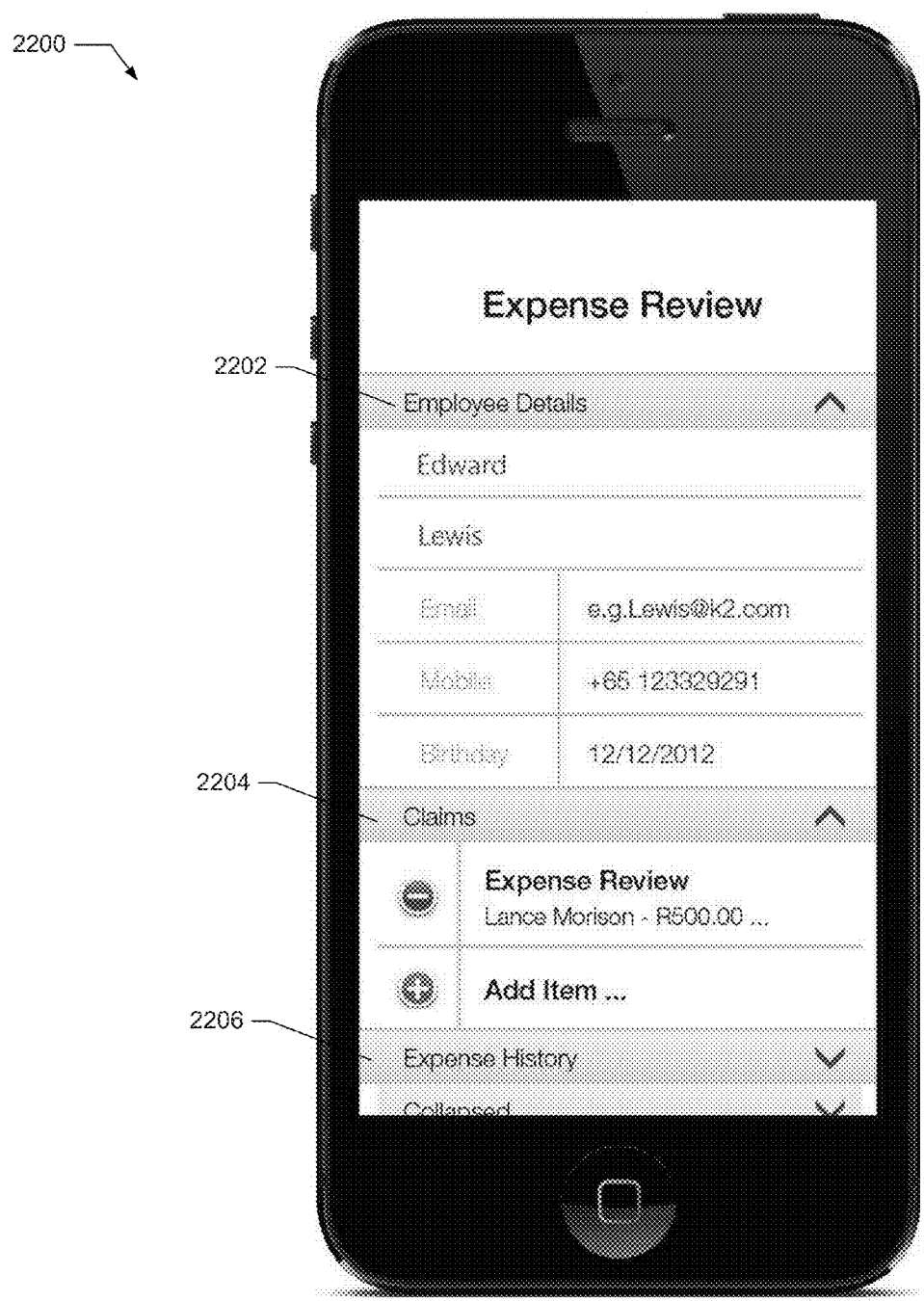
FIGS. 22 to 32 are example screenshots of a form translated to a native application on a mobile device, according to an example embodiment of the present invention.

FIG. 22 illustrates an example screen shot 2200 of an application transformed for an iPhone® running the Apple iOS®. The application on the mobile device contains the same regions as the desktop form. For example, the mobile includes an Employee Details region 2202 (corresponding to item 1712 in screen shot 1700), a Claims region 2204

(corresponding to item 1714 in screen shot 1700) and an Expense History region 2206 (corresponding to item 1716 in screen shot 1700). The native controls fit appropriately into the available screen size and support the functionality of the desktop form, including collapsible regions. The regions in the application use the native collapsible region control on the iPhone.

Figure 23:
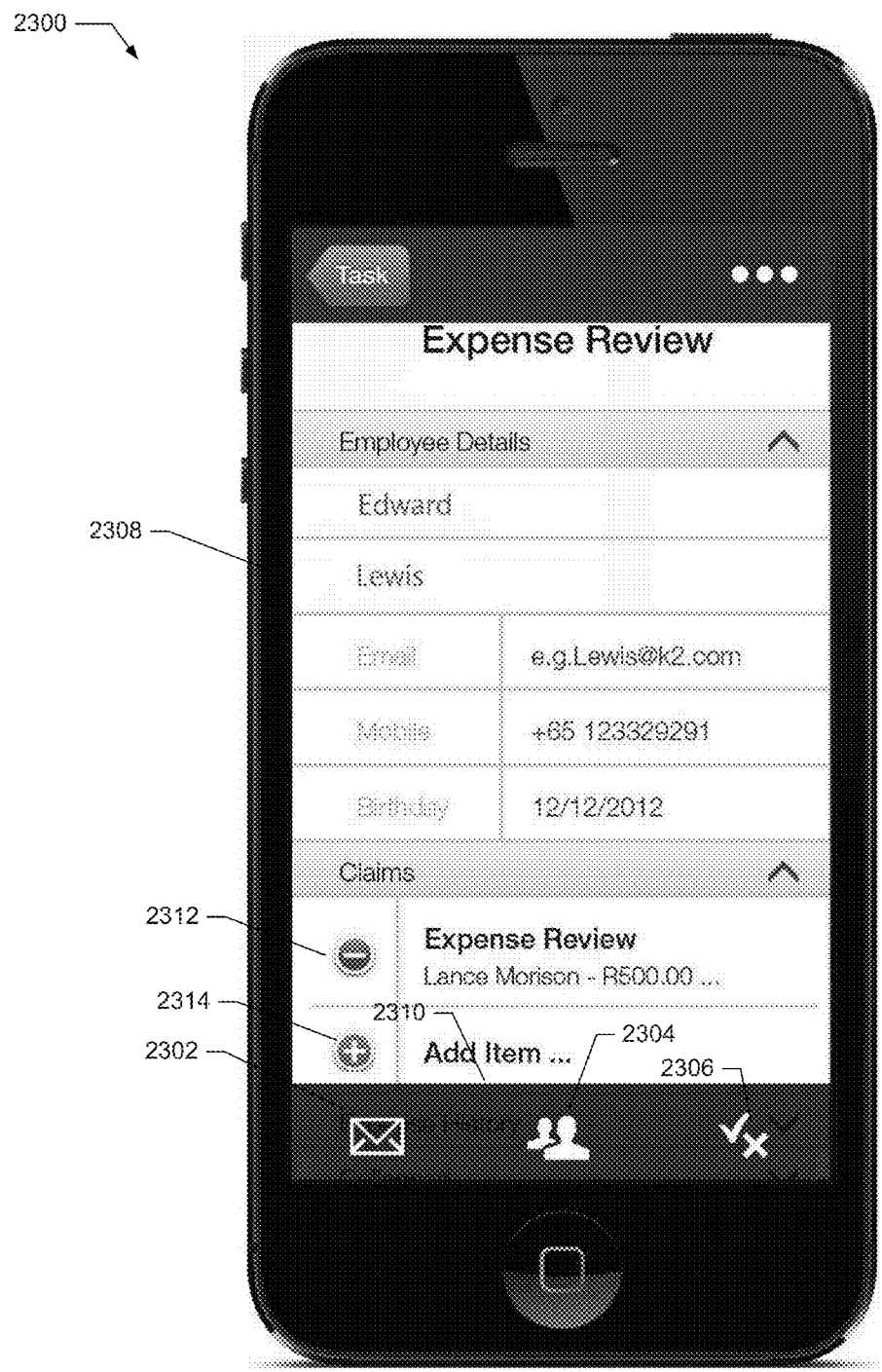

FIG. 23 illustrates an example screen shot 2300 of the application illustrating that the form buttons Send Mail 1702, Notify 1704 and Submit 1706 in screen shot 1700 have been translated to native buttons 2302, 2304 and 2306, respectively, on the device in a standard overlay area 2310 of the screen. It should be appreciated that using native buttons on the device allows the application to retain the functionality, such as the actions of the buttons, of the form on the mobile device while taking advantage of capabilities to maximize the screen real estate by moving the buttons off the application display 2308 and into the overlay section 2310. The overlay section 2310 is available by using a swiping gesture common for applications on the iPhone device.

The form's Claims region 1714 has been converted to a native list control 2312 on the iPhone, which takes advantage of list gestures that allow for sideways swiping to provide a delete capability and a list item 2314 that represents the ability to add an item. These conversions allow the same functionality as the desktop form to be available on the iPhone with much less screen real estate and different user interface. The mobile application engine conversion provides a natural user experience because the controls are native to the device and automatically support the gestures familiar to iPhone users.

Figure 24:

FIG. 24 illustrates an example screen shot 2400 of the calendar control of the form 1802 converted to a calendar control 2402, which uses the native calendar picker control of the iPhone and takes advantage of a slot-style scrolling familiar to iPhone users for selecting dates. On the desktop form, the calendar 1802 is implemented using a standard web-browser style date picker.

Figure 25:
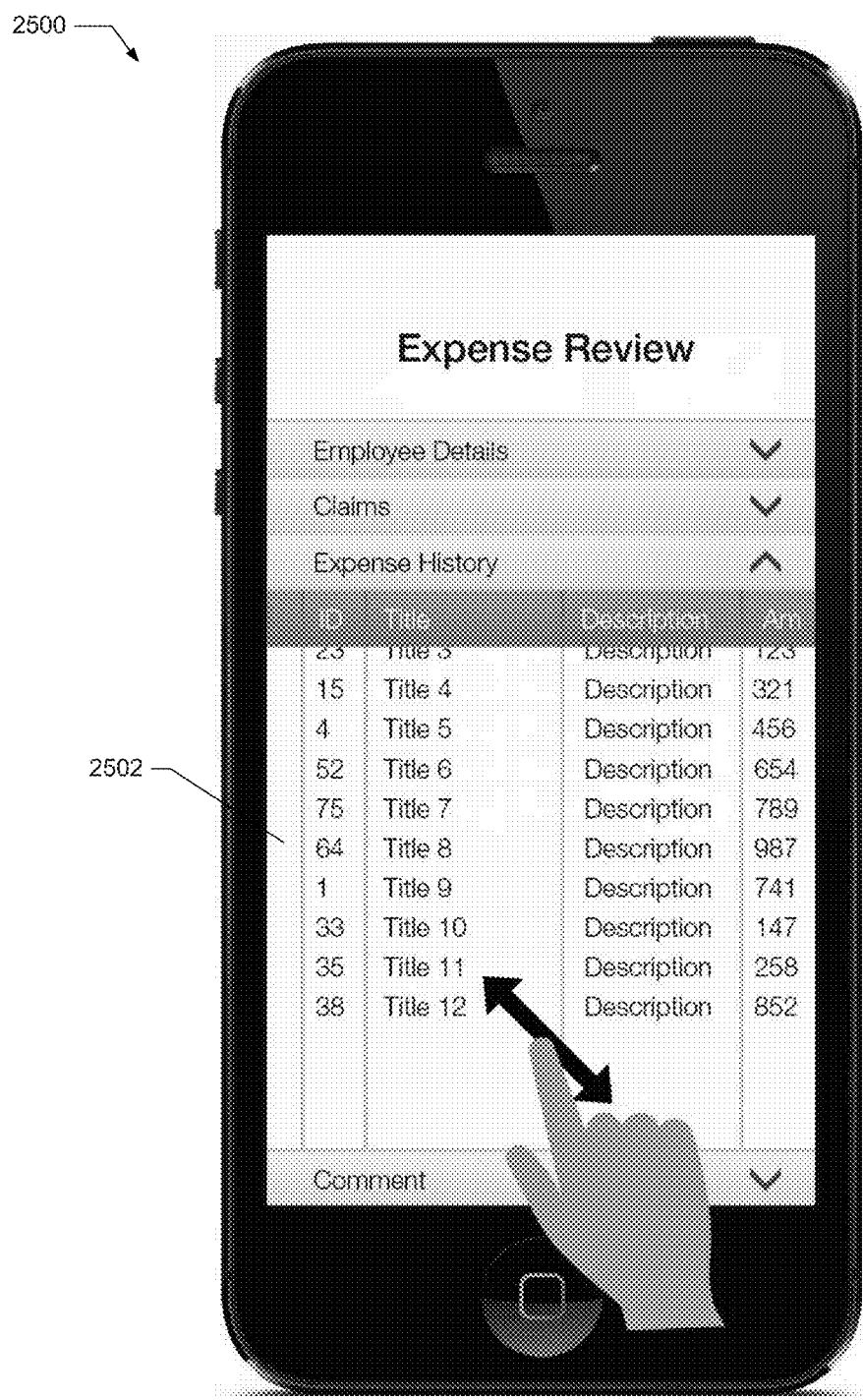
Figure 26:
Figure 27:

FIG. 25 illustrates an example screen shot 2500 of the form's Expense History region 1716 that has been converted by the mobile application engine to a native grid control 2502 on the iPhone. As illustrated in screen shots 2600 and 2700 in FIGS. 26 and 27, the Expense History region 2502 on the application can be manipulated by the user via native gestures available on the device to support grid navigation via scrolling (FIG. 26) and zooming (FIG. 27).

Figure 28:
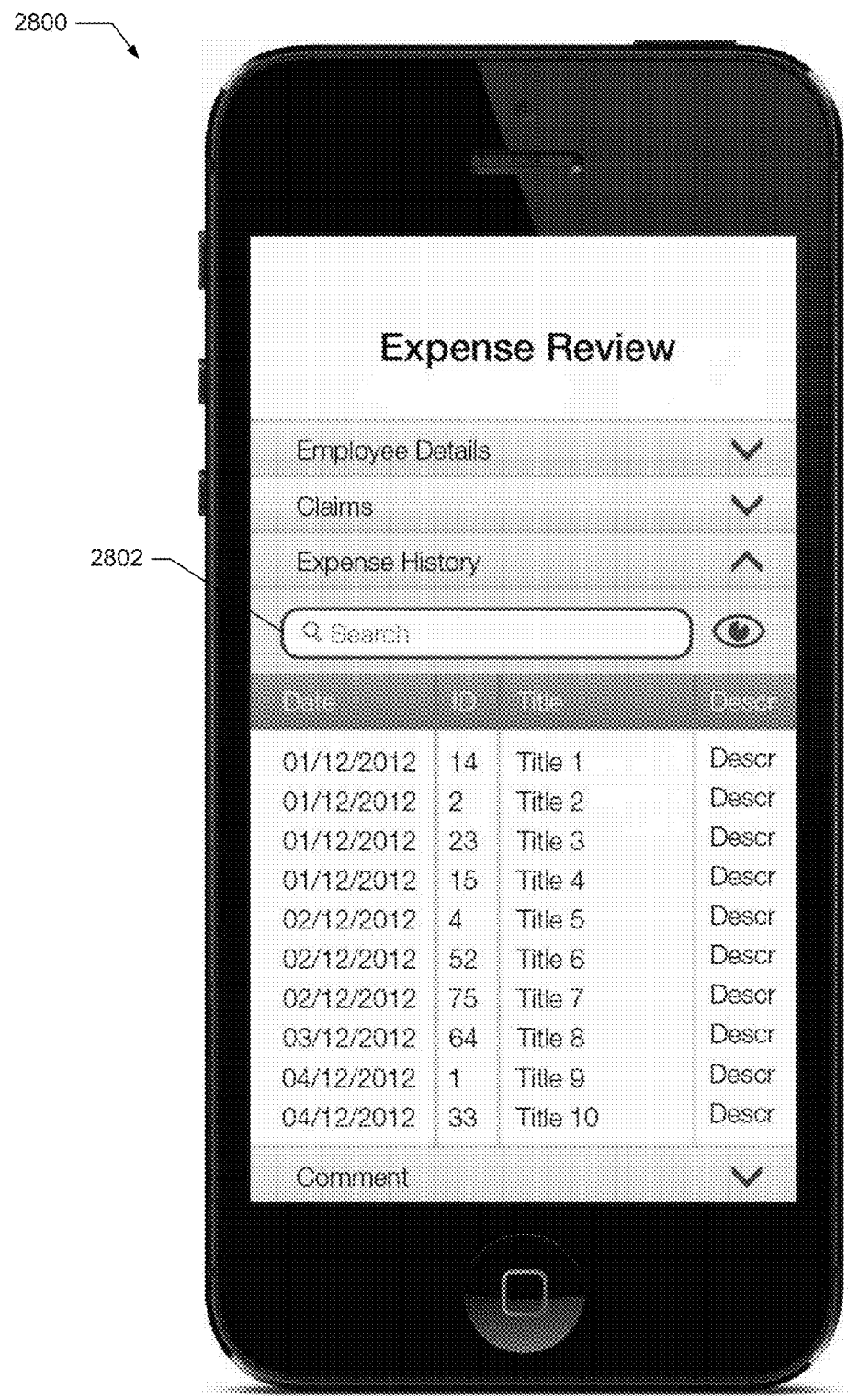
Figure 29:

The mobile application engine also converts the search capabilities available in the form's Expense History region 1716. As illustrated in FIG. 28, the form's Expense History region's search capabilities have been converted to a native search box control 2802 on the mobile device. The actions, events and properties of the searchable grid of the desktop form have been converted by the mobile application engine to native search and grid controls on the iPhone, allowing the user to search for items in the grid by using the search capabilities common for applications on the iPhone device. For example, as illustrated in screen shot 2900 in FIG. 29, the user can select fields 2902 through which to search.

Figure 30:

As illustrated in screen shot 3000 in FIG. 30, the form's Expense History search action has been converted by the mobile application engine to execute native scripting capabilities on the iPhone, allowing for the same hit highlighting search experience 3002 as on the desktop form.

Figure 31:

FIG. 31 illustrates an example screen shot 3100 of the application's Expense History grid 3102. The application's Expense History grid 3102 supports the same actions as the desktop grid 1904, allowing for column customizations such as setting the column width to a fixed size, sorting the data ascending or descending, and searching specific columns.

Figure 32:
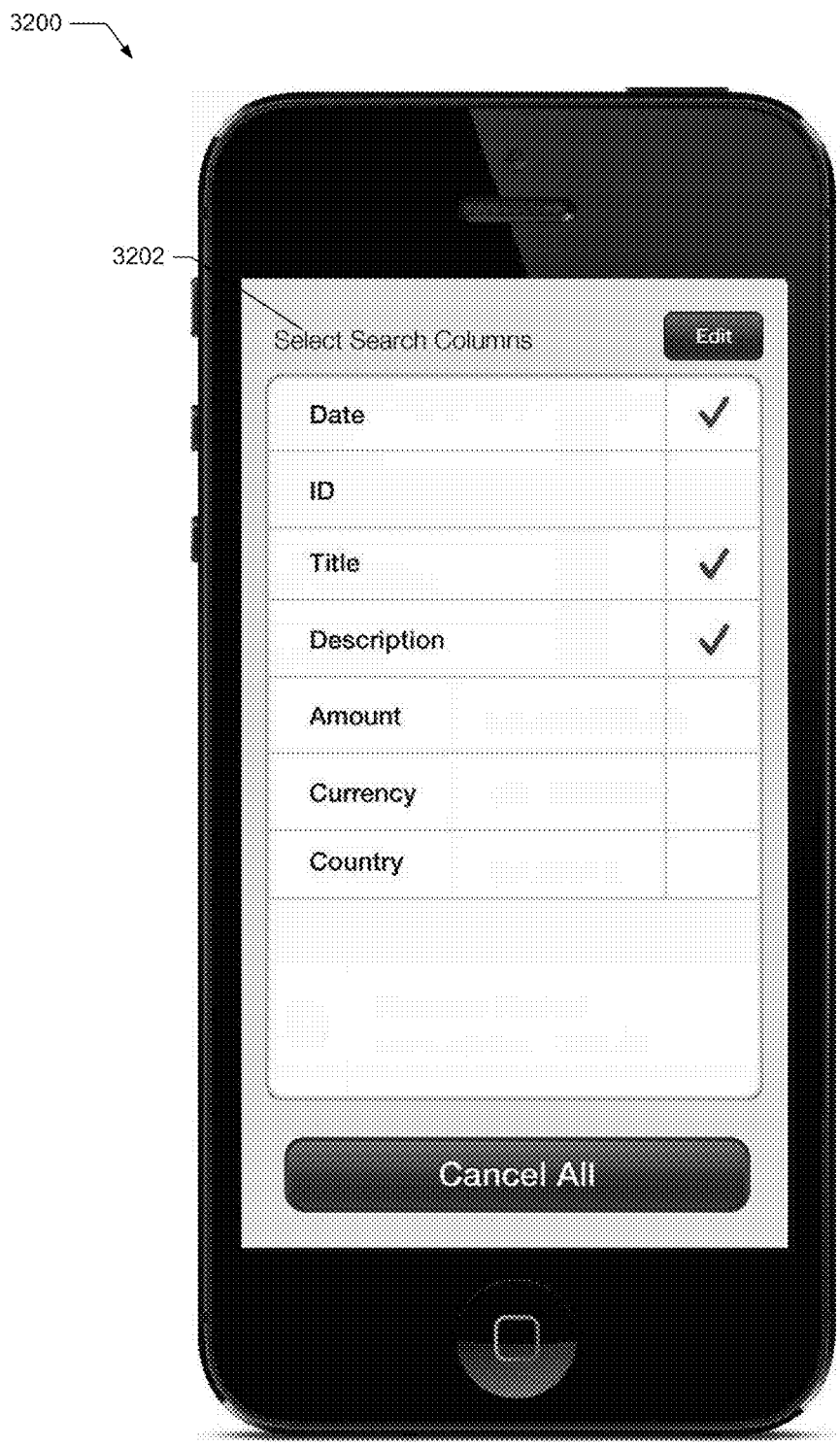

Example screen shot 3200 in FIG. 32 illustrates that the form's Expense History grid search support for specifying the columns to search 2102 has been converted by the mobile application engine to a native column selection popup page 3202 on the iPhone device.

Figure 33:
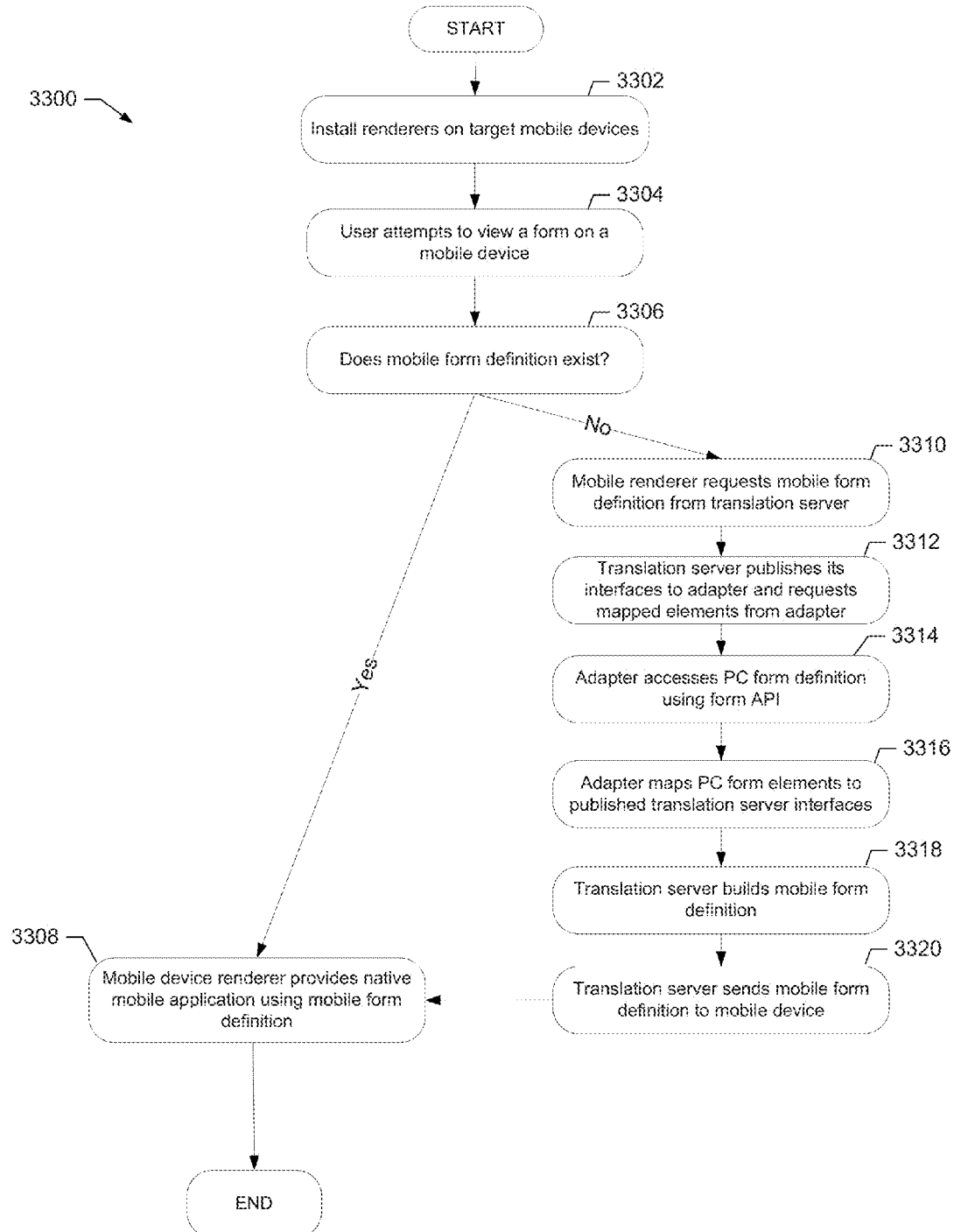
FIG. 33 is a flowchart of an example process for providing a native mobile application, according to an example embodiment of the present invention.

FIG. 33 illustrates an example process 3300 for providing a native mobile application. Upon starting process 3300 at the start oval, renderers are installed on target mobile devices, as shown at block 3302. A user attempts to view a form on a mobile device, as shown at block 3304. The mobile application engine checks whether a mobile form definition exists on the mobile phone, as shown at block 3306. If a mobile form definition exists on the mobile phone, the mobile device renderer provides a native mobile application using the mobile form definition, as shown at block 3308, and the process comes to an end, as shown by the End oval.

If a mobile form definition does not exist on the mobile phone, the mobile renderer requests a mobile form definition from the translation server, as shown at block 3310. The translation server publishes its interfaces to the adapter and requests mapped elements from the adapter, as shown at block 3312. The adapter accesses the PC form definition using a form API, as shown at block 3314. The adapter maps the PC form elements to published translation server interfaces, as shown at block 3316. The translation server builds the mobile form definition, as shown at block 3318. The translation server sends the mobile form definition to the mobile device, as shown at block 3320. The mobile device renderer then provides a native mobile application using the mobile form definition, as shown at block 3308. Process 3300 then ends at the End oval.

Figure 34:
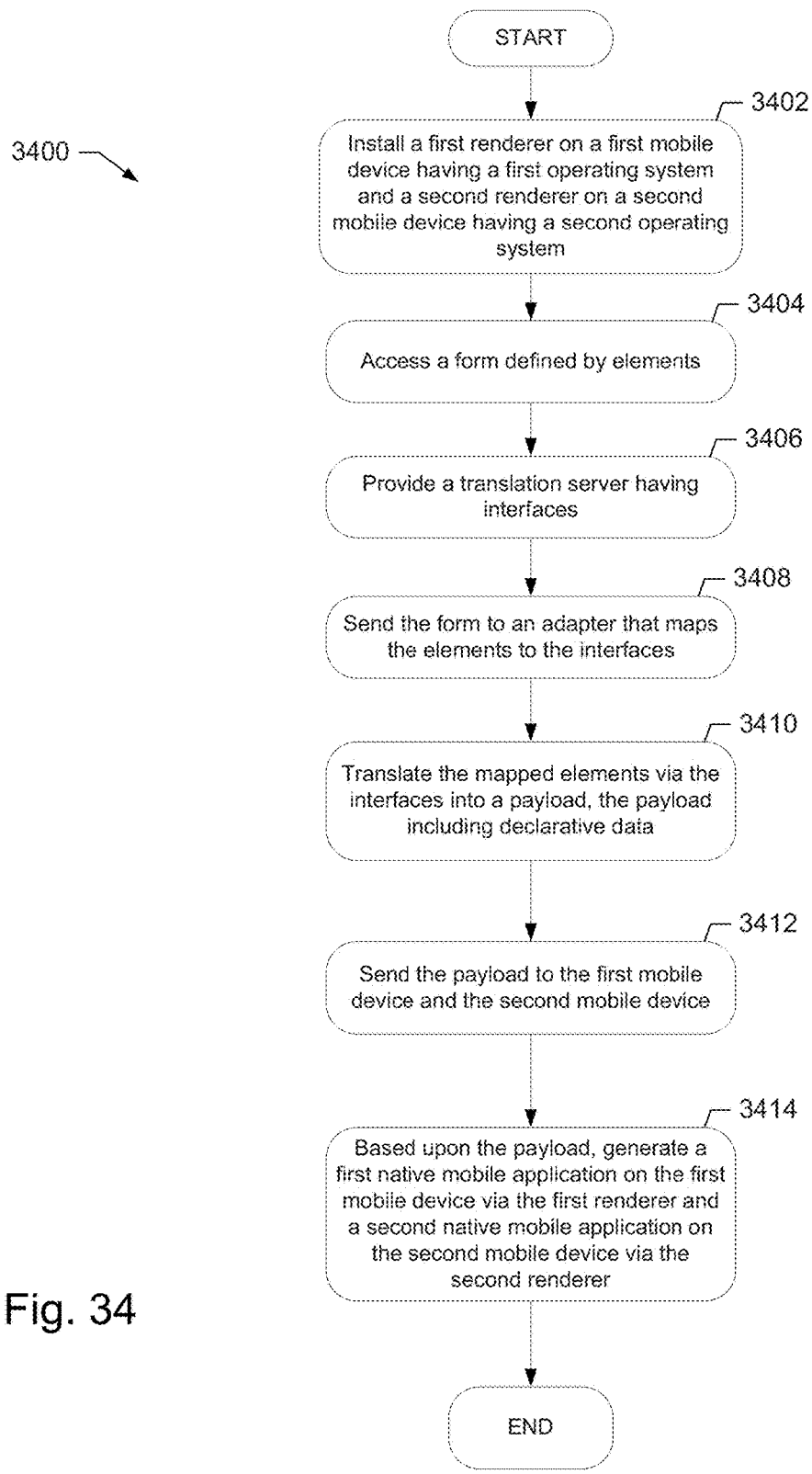
FIG. 34 is a flowchart of another example process for providing a native mobile application, according to another example embodiment of the present invention.

FIG. 34 illustrates another example process 3400 for providing a native mobile application. Upon starting process 3400 at the start oval, a first renderer is installed on a first mobile device having a first operating system, and a second renderer is installed on a second mobile device having a second operating system, as shown at block 3402. A form defined by elements is accessed, as shown at block 3404. A translation server having interfaces is provided, as shown at block 3406. The form is sent to an adapter that maps the elements to the interfaces, as shown at block 3408. The mapped elements are translated via the interfaces into a payload, where the payload includes declarative data, as shown at block 3410. The payload is sent to the first mobile device and the second mobile device, as shown at block 3412. Based upon the payload, a first native mobile application is generated on the first mobile device via the first renderer, and a second native mobile application is generated on the second mobile device via the second renderer, as shown at block 3414. Process 3400 then ends at the End oval.

Figure 35:
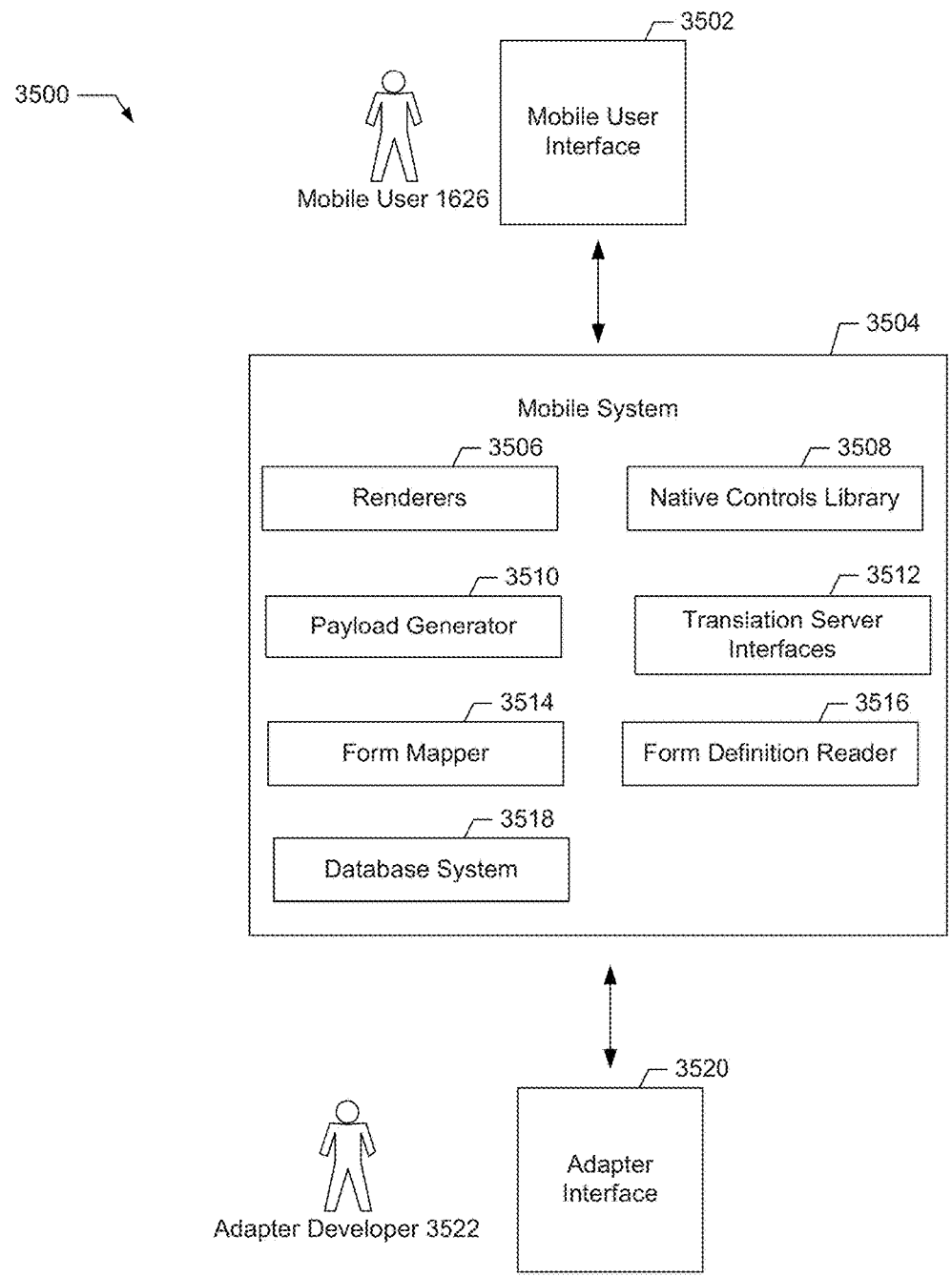
FIG. 35 is a block diagram showing an example mobile application engine structure, according to an example embodiment of the present invention.

FIG. 35 is a block diagram showing an example mobile application engine structure 3500 which includes mobile user interface 3502, mobile system 3504 and adapter interface 3520.

The example mobile application engine structure 3500 may be implemented on one or more host devices 104 accessing one or more servers 108. In an example embodiment, the mobile system 3504 includes renderers 3506, native controls library 3508, payload generator 3510, translation server interfaces 3512, form mapper 3514, form definition reader 3516 and database system 3518.

A mobile user 1626 may interact with mobile user interface 3502 to view and manipulate applications on a mobile device. An adapter developer 3522 may interact with adapter interface 3520 to write an adapter that can be used to access a form definition and translate the form definition so that a translation server can interpret the form definition.

The form definition may access data stored in database system 3518. A form definition reader 3516 may read the form definition and allow form mapper 3514 to map the form definition for translation server interfaces 3512. In one embodiment, the translation server interfaces 3512 may correspond to different elements of the form definition. Payload generator 3510 may output a payload that includes mapped form definition data. Renderers 3506 may build mobile applications based on the payload. It should be appreciated that mobile system 3504 includes one renderer for each type of target mobile operating system. Native controls library 3508 provides native operating system controls to the renderers so that a mobile application built by a renderer behaves, looks and feels like a native application on the respective mobile device.

Figure 36:
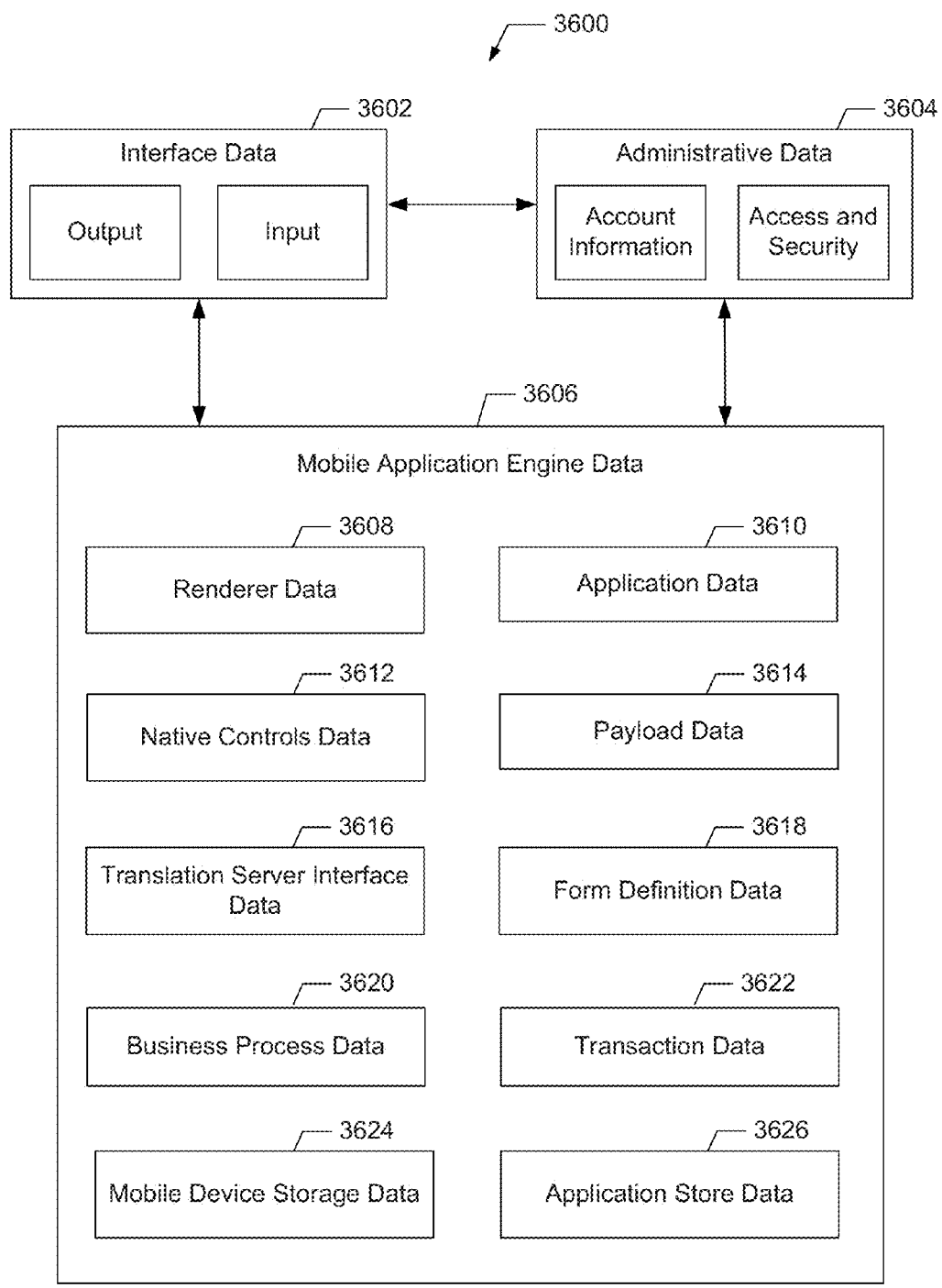
FIG. 36 is a block diagram showing an example data architecture, according to an example embodiment of the present invention.

FIG. 36 illustrates a block diagram of an example data architecture 3600. In the example data architecture 3600, interface data 3602, administrative data 3604, and mobile application engine data 3606 interact with each other, for example, based on user commands or requests. The interface data 3602, administrative data 3604, and mobile application engine data 3606 may be stored on any suitable storage medium (e.g., server 226). It should be appreciated that different types of data may use different data formats, storage mechanisms, etc. Further, various applications may be associated with processing interface data 3602, administrative data 3604, and mobile application engine data 3606. Various other or different types of data may be included in the example data architecture 3600.

Interface data 3602 may include input and output data of various kinds. For example, input data may include mouse click data, scrolling data, hover data, keyboard data, touch screen data, voice recognition data, etc., while output data may include image data, text data, video data, audio data, etc. Interface data 3602 may include formatting, user interface options, links or access to other websites or applications, and the like. Interface data 3602 may include applications used to provide or monitor interface activities and handle input and output data.

Administrative data 3604 may include data and applications regarding account information and access and security. For example, administrative data 3604 may include information used for creating or modifying mobile user accounts or adapter developer accounts. Further, administrative data 3604 may include access data and/or security data. Administrative data 3604 may interact with interface data 3602 in various manners, providing a user interface 3502 and 3520 with administrative features, such as implementing a user login, password, and the like.

Mobile application engine data 3606 may include, for example, renderer data 3608, application data 3610, native controls data 3612, payload data 3614, translation server interface data 3616, form definition data 3618, business process data 3620, transaction data 3622, mobile device storage data 3624 and application store data 3626.

Renderer data 3608 may include information about different operating systems. Application data 3610 may include data associated with a mobile application rendered on a mobile device.

Native controls data 3612 may include data specific to an operating system on which an application is rendered for controlling and interacting with the operating system. Payload data 3614 may include an HTML tag and markup that can be rendered by a renderer. Translation server interface data 3616 may include data specific for each type of form element that is available for translation.

Form definition data 3618 may include form layout (e.g., views, tabs, tables, controls, etc.) data, rules data, expressions data, validation data, events data, actions data, authentication data and data bindings data (e.g., whether a form must be online in order to use the form). Business process data 3620 may include data related to a specific business process that a user wishes to make available as a native application. Transaction data 3622 may include associated data relating to a single transaction. Mobile device storage data 3624 may include file directory or structure information for a target mobile device and may be made available to the native mobile application. Application store data 3626 may include information about a store associated with a respective operating system for downloading and installing a renderer.

Mobile application engine data 3606 may be maintained in various servers 108, in databases or other files. It should be appreciated that, for example, a host device 104 may manipulate mobile application engine data 3606 in accordance with the administrative data 3604 and interface data 3602 to provide native applications to users.

Example Applications:

As part of his work, Bob frequently travels and incurs various expenses. He has access rights to the Expense Claim Solution, and due to these rights, the solution is automatically accessible in the K2 Mobile application on his iPad. This application allows Bob to submit new expense claims, approve expenses via his Task List (for his direct reports) and also track the status of previous expense claims.

When filling a new expense claim, Bob can make use of device-specific features such as the built-in camera in order to easily take a picture of a receipt and attach the picture to the form via the picture control. Once all the details are completed, Bob can submit the form directly from the mobile device.

In summary, persons of ordinary skill in the art will readily appreciate that inventive methods and apparatus related to automated workflows and forms have been disclosed. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

The invention is claimed as follows:

1. A method for generating native mobile applications, the method comprising:

configuring a first renderer for a first operating system and a second renderer for a different second operating system, the first and second renderers specifically configured to generate native mobile applications from mobile form definitions specified in a declarative format;

installing the first renderer on a first mobile device having the first operating system and the second renderer on a second mobile device having the second operating system;

accessing a form defined by elements including at least one of a form layout, rules, expressions, validations, events, actions, authentication and data bindings, the form being defined for use on a personal computer platform;

providing a translation server having interfaces;

providing an adapter that is configured to use a form application programming interface to map the elements of the form to the interfaces provided by the translation server;

translating the mapped elements via the interfaces into a payload, the payload including a mobile form definition that is specified in the declarative format for use with the first and second renderers, the mobile form definition including the elements from the form that were defined for the personal computer platform;

sending the payload to the first mobile device and the second mobile device;

using the first renderer to generate on the first mobile device, based upon the payload, a first native mobile application that includes the elements of the form, the first native mobile application utilizing first native controls, a first layout, and a first scripting language of the first mobile device; and using the second renderer to generate on the second mobile device, based upon the same payload, a second native mobile application that includes the elements of the form for the personal computer platform, the second native mobile application utilizing second native controls, a second layout, and a second scripting language of the second mobile device.

2. The method of claim 1, wherein the first renderer is provided by a first provider in a first electronic application store and the second renderer is provided by a second provider in a second electronic application store.

3. The method of claim 2, wherein the first operating system is developed by the first provider and the second operating system is developed by the second provider.

4. The method of claim 1, wherein the form layout includes at least one of a view, tab, table, control, and authentication.

5. The method of claim 1, wherein a rule is defined by an event and an action.

6. The method of claim 5, wherein an action for a rule is triggered by a respective event.

7. The method of claim 1, wherein the form allows creating, updating, reading and deleting data in a database.

8. The method of claim 7, wherein the first and second mobile applications allow creating, updating, reading and deleting the data in the database.

9. The method of claim 1, wherein each interface is designed to accept exactly one element from the adapter.

10. The method of claim 1, wherein the first and second native controls of the first and second mobile devices include at least one of a global position system sensor, a camera, and a phonebook.

11. The method of claim 1, wherein the form definition uses a forms technology, and the adapter is written for the forms technology.

12. The method of claim 1, wherein the payload that is translated from the mapped elements is independent of the first and second operating systems.

13. The method of claim 1, further comprising, before sending the payload to the first and second mobile devices, storing to the payload at least one of a connection setting and a security setting for connecting to a server, wherein the first renderer generates the first native mobile application with at least one of the connection setting and the security setting to communicatively couple to the server, and wherein the second renderer generates the second native mobile application with at least one of the connection setting and the security setting to communicatively couple to the server.

14. A method for generating native mobile applications, the method comprising:

configuring a renderer for a specific operating system, the renderer specifically configured to generate native mobile applications from mobile form definitions specified in a declarative format;

installing the renderer on a mobile device having the operating system;

accessing a form defined by elements including at least one of a form layout, rules, expressions, validations, events, actions, authentication and data bindings, the form being defined for use on a personal computer platform;

providing a translation server having interfaces;

providing an adapter that is configured to use a form application programming interface to map the elements of the form to the interfaces provided by the translation server;

translating the mapped elements via the interfaces into a payload, the payload including a mobile form definition that is specified in the declarative format for use on the renderer, the mobile form definition including the elements from the form that were defined for the personal computer platform;

sending the payload to the mobile device; and using the renderer to generate on the mobile device, based upon the payload, a native mobile application that includes the elements of the form, the native mobile application utilizing native controls, layout, and scripting language of the mobile device.

15. A mobile application system comprising:

a mobile device including a renderer and an operating system, the renderer being configured specifically for the operating system and configured to generate native mobile applications from mobile form definitions specified in a declarative format;

a translation server including interfaces;

a form server including a form defined by elements, the form being defined for use on a personal computer platform; and an adapter including a mapper that is configured to use a form application programming interface to map the elements of the form to the interfaces provided by the translation server;

wherein the translation server translates the mapped elements via the interfaces, independent of the operating system, into a payload, the payload including a mobile form definition that is specified in the declarative format for use on the renderer, the mobile form definition including the elements from the form that were defined for the personal computer platform, and wherein the mobile device uses the renderer to generate, based on the payload, a native mobile application that includes the elements of the form, the native mobile application utilizing native controls, layout, and scripting language of the mobile device.

16. The system of claim 15, wherein the adapter comprises a non-transitory computer readable medium that stores instructions causing the adapter to:

access the form defined by form elements including at least one of a form layout, rules, expressions, validations, events, actions, authentication and data bindings; and map the form elements to predefined interfaces for the translation server.

17. The system of claim 15, wherein the form is a first form, the elements are first elements, the declarative format is a first declarative format, the native mobile application is a first native mobile application, and the form server includes a second form defined by second elements, the second form being defined for use on the personal computer platform; and wherein the mapper maps the second elements to the interfaces of the translation server, the translation server translates the second mapped elements via the interfaces, independent of the operating system, into a second payload, the second payload including a second mobile form definition that is specified in a second declarative format for use on the renderer, the second mobile form definition including the second elements from the second form that was defined for the personal computer platform, and the mobile device uses the same renderer to generate, based on the second payload, a second native mobile application that includes the elements of the second form, the second native mobile application utilizing the native controls, the layout, and the scripting language of the mobile device.

18. The system of claim 15, wherein the form is a first form, the elements are first elements, the declarative format is a first declarative format, the interfaces are first interfaces, the native mobile application is a first native mobile application, the form server includes a second form defined by second elements, and the translation server includes second interfaces, the second form being defined for use on the personal computer platform; and wherein the mapper maps the second elements to the second interfaces, the translation server translates the second mapped elements via the second interfaces, independent of the operating system, into a second payload, the second payload including a second mobile form definition that is specified in a second declarative format for use on the renderer, the second mobile form definition including the second elements from the second form that was defined for the personal computer platform, and the mobile device uses the same renderer to generate, based on the second payload, a second native mobile application that includes the elements of the second form, the second native mobile application utilizing the native controls, the layout, and the scripting language of the mobile device.

19. A translation server comprising a non-transitory computer readable medium that stores instructions causing the translation server to map form elements into a payload independent of a mobile device operating system including a mobile form definition that is specified in a declarative format for use on a renderer and the mobile device operating system, the mobile form definition including elements from a form that was defined for a personal computer platform, wherein a mobile device running the mobile device operating system includes the renderer configured for the mobile device operating system and configured to generate on the first mobile device, based upon and the payload, a native mobile application that includes the elements of the form utilizing native controls, layout, and scripting language of the mobile device, wherein the renderer is specifically configured to generate native mobile applications from mobile form definitions specified in the declarative format.

* * * * *